(12) United States Patent
Katoh

(10) Patent No.: US 8,740,473 B2
(45) Date of Patent: Jun. 3, 2014

(54) OPTICAL CONNECTOR AND CONNECTOR CONNECTION SYSTEM

(75) Inventor: Seiji Katoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 298 days.

(21) Appl. No.: 13/009,487

(22) Filed: Jan. 19, 2011

(65) Prior Publication Data

US 2012/0027359 A1    Feb. 2, 2012

(30) Foreign Application Priority Data

Jul. 30, 2010   (JP) ................................ 2010-173056
Sep. 7, 2010    (JP) ................................ 2010-199954

(51) Int. Cl.
*G02F 1/1345*   (2006.01)
*H01R 13/627*   (2006.01)

(52) U.S. Cl.
USPC .................... 385/53; 385/60; 385/62; 385/93

(58) Field of Classification Search
CPC .... G02B 6/3831; G02B 6/3879; G02B 6/381; G02B 6/3807; G02B 6/3853; G02B 6/389; G02B 6/3873; G02B 6/3869; G02B 6/4284; G02F 1/1345
USPC ......................................... 385/53, 60, 62, 93
See application file for complete search history.

(56) References Cited

U.S. PATENT DOCUMENTS

| | | | |
|---|---|---|---|
| 5,166,995 A * | 11/1992 | Briggs et al. ..................... | 385/58 |
| 5,896,479 A * | 4/1999 | Vladic ............................. | 385/59 |
| 6,860,648 B2 | 3/2005 | Jin et al. | |
| 7,543,994 B2 | 6/2009 | McColloch | |
| 8,083,547 B2 * | 12/2011 | Roth et al. ............... | 439/607.23 |
| 8,277,128 B2 * | 10/2012 | Hackett ........................... | 385/58 |
| 8,356,947 B2 * | 1/2013 | Katagiyama et al. ........... | 385/60 |
| 2001/0019654 A1 * | 9/2001 | Waldron et al. ............... | 385/134 |

(Continued)

FOREIGN PATENT DOCUMENTS

| | | |
|---|---|---|
| CN | 1175002 A | 3/1998 |
| CN | 1332857 A | 1/2002 |

(Continued)

OTHER PUBLICATIONS

Chinese Office Action issued by the Chinese Patent Office in Chinese Patent Application No. 201010622597.5 dated Sep. 3, 2013.
Office Action dated Nov. 26, 2013 by the Japanese Patent and Trademark Office in counterpart Japanese Patent Application No. 2010-173056.

*Primary Examiner* — Kaveh Kianni
(74) *Attorney, Agent, or Firm* — Sughrue Mion, PLLC

(57) ABSTRACT

An optical connector includes: an engaging member having a pair of elastic pieces that can be engaged with locking portions on both sides of a receiving-side optical connector; and a movable tubular housing externally fitted to the engaging member, wherein the pair of elastic pieces approaches each other by an engagement with the locking portions on both sides of the receiving-side optical connector, and thereby, the housing becomes movable forward with respect to the portion of the engaging member that engages with the locking portions, and wherein an engagement state between the elastic pieces and the locking portions on both sides of the receiving-side optical connector is maintained as the pair of elastic pieces abuts an inside of the housing thereby regulating a movement in a direction of being separated from each other when the housing has moved forward with respect to the engaging member.

10 Claims, 26 Drawing Sheets

(56) References Cited

U.S. PATENT DOCUMENTS

| | | | |
|---|---|---|---|
| 2003/0156796 A1* | 8/2003 | Rathnam et al. | 385/55 |
| 2005/0117854 A1* | 6/2005 | Chiu et al. | 385/92 |
| 2005/0281509 A1* | 12/2005 | Cox et al. | 385/59 |
| 2007/0025665 A1* | 2/2007 | Dean et al. | 385/78 |
| 2008/0095506 A1* | 4/2008 | McColloch | 385/89 |
| 2008/0145001 A1* | 6/2008 | Beck et al. | 385/78 |
| 2009/0074372 A1* | 3/2009 | Solheid et al. | 385/135 |
| 2010/0202736 A1* | 8/2010 | Roth | 385/59 |
| 2010/0290741 A1* | 11/2010 | Lu et al. | 385/60 |
| 2010/0310213 A1* | 12/2010 | Lewallen et al. | 385/75 |

FOREIGN PATENT DOCUMENTS

| | | |
|---|---|---|
| CN | 101526652 A | 9/2009 |
| JP | S60-68504 U | 5/1985 |
| JP | 60-205511 A | 10/1985 |
| JP | 60-205512 A | 10/1985 |
| JP | 2002-202434 A | 7/2002 |
| JP | 2008-191187 A | 8/2008 |

* cited by examiner

OPTICAL CONNECTOR AND CONNECTOR CONNECTION SYSTEM

CROSS-REFERENCE TO RELATED APPLICATION

Priority is claimed on Japanese Patent Application No. 2010-173056 filed on Jul. 30, 2010, and Japanese Patent Application No. 2010-199954 filed on Sep. 7, 2010, the contents of which are incorporated herein by reference.

BACKGROUND OF THE INVENTION

1. Field of the Invention

The present invention relates to an optical connector capable of being fastened by a push-on method, and a connector connection system using the same.

2. Description of the Related Art

As optical connectors, for example, there is known a plug-adapter-plug coupling-type optical connector, such as an MPO (Multi-fiber Push On)-type optical connector (an F13-type optical connector established in JIS C 5982) (for example, Japanese Standards Association, "F13-Type Multi-core Optical Connector C 5982: 1997", JIS Handbook: Electronic Testing Method and Optoelectronics, Publishing Place: Japanese Standards Association (Foundation), Apr. 24, 1998).

Meanwhile, recently, in high-performance computers or computer systems, a number of photoelectric composite boards are mounted and optical communication is performed using optical fibers disposed between the boards. For this reason, there is a demand for performing connector connection of the optical fibers on a circuit board.

However, for example, in order to fasten the above-described MPO-type optical connector on the circuit board, an adapter is required. Additionally, since the thickness of a connector (plug) itself is large, in a case where a plurality of circuit boards is arranged in parallel, it is difficult to narrow the spacing between the circuit boards.

In consideration of the above problems, the object of the present invention is to provide an optical connector which can realize fastening without using an adapter and reduce (slim) a thickness dimension compared to the MPO-type optical connector, and a connector connection system using the same.

SUMMARY OF THE INVENTION

An optical connector related to an aspect of the present invention includes: an engaging member having a pair of elastic pieces that can be engaged with locking portions on both sides of a receiving-side optical connector; and a movable tubular housing externally fitted to the engaging member. The pair of elastic pieces approaches each other as a result of an engagement with the locking portions on both sides of the receiving-side optical connector, and thereby, the housing becomes movable forward with respect to the portion of the engaging member that engages with the locking portions. An engagement state between the elastic pieces and the locking portions on both sides of the receiving-side optical connector is maintained as the pair of elastic pieces abuts an inside of the housing, thereby regulating a movement in a direction of being separated from each other when the housing has moved forward with respect to the engaging member.

Additionally, it is also possible to adopt a configuration in which the engaging member further includes a biasing member receiving portion which takes a reaction force of a biasing member which biases a ferrule forward, and the pair of elastic pieces protrude forward from the biasing member receiving portion.

Additionally, tips of the pair of elastic pieces may have protruding claws.

Additionally, it is also possible to adopt a configuration in which the tip portions of the elastic pieces are provided with inclined surfaces which incline to a side opposite to the protruding claws toward a front, and a front end portion of the housing abuts the inclined surfaces from a rear side thereof, and thereby, movement of the housing to the front is regulated by the tip portions of the elastic pieces.

Additionally, the biasing member may be a spring.

Additionally, it is also possible to adopt a configuration in which the housing and the engaging member are provided with latch structures which engage with each other by engaging protrusions and engaging recesses, and the engaging protrusions abut edges of the engaging recesses, thereby regulating forward or rearward movement of the housing with respect to the engaging member.

Additionally, it is also possible to adopt a configuration in which the engaging member further includes a regulating member which regulates forward movement of a ferrule which is biased forward.

Additionally, it is also possible to adopt a configuration in which the housing has a ferrule engaging portion, which is engageable with a flange portion of a ferrule, at a front side thereof.

Additionally, it is also possible to adopt a configuration in which a ferrule is an MT-type optical connector, and is provided between the pair of elastic pieces, with a longitudinal direction of a rectangular tip face for abutting and joining being aligned with a direction of a spacing between the pair of elastic pieces of the engaging member.

Additionally, it is also possible to adopt a configuration in which an operating protrusion is provided at an outer periphery of the housing so as to protrude thereof.

Additionally, a connector connection system related to another aspect of the present invention includes: an optical fiber having a connector in which the above optical connector is assembled at a tip of the optical fiber, and a board with a connector formed by mounting a receiving-side optical connector to which the optical connector is fastened on a circuit board.

According to the present invention, the optical connector can be fastened to the receiving-side optical connector without using an adapter. Moreover, the optical connector can easily realize reduction (slimming) of the thickness dimension compared to the MPO-type optical connector.

DETAILED DESCRIPTION OF THE INVENTION

An optical connector and a connector connection system of one embodiment of the present invention will now be described below with reference to the drawings.

Figure 1A:
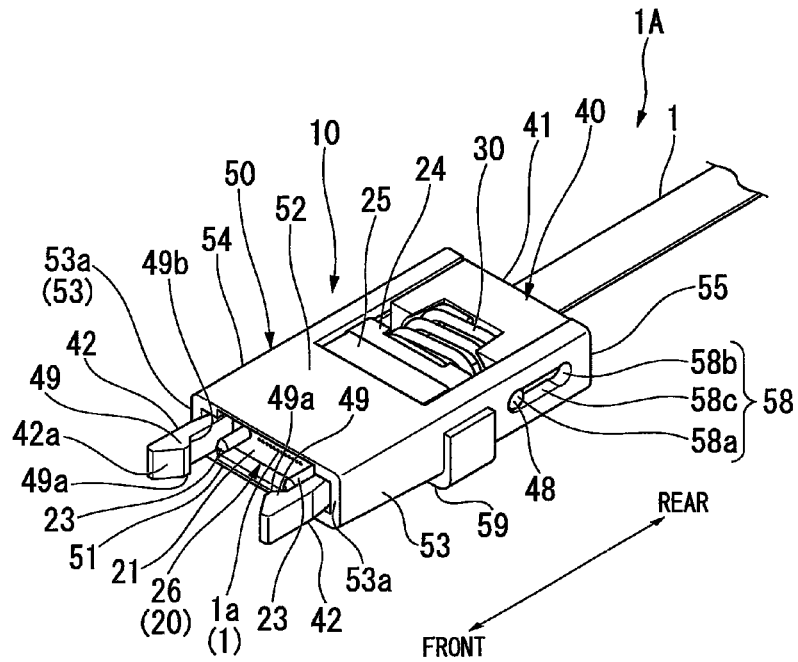
FIG. 1A is a perspective view showing an optical connector of one embodiment of the present invention, and showing an initial state where a flange portion of a rear end of a ferrule abuts a rear end face of a second face plate portion of a housing at a standby position for an engaging member.
Figure 1B:
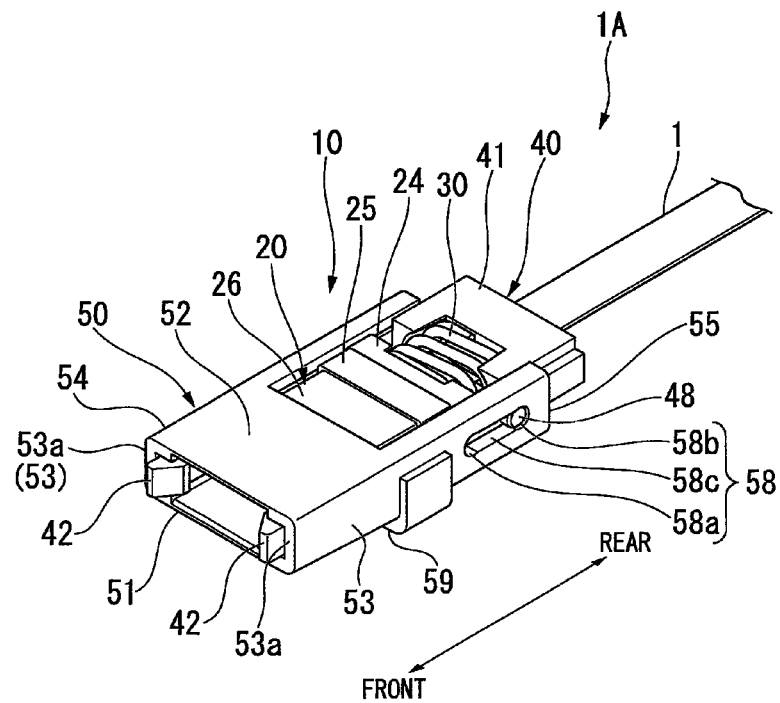
FIG. 1B is a perspective view showing a state where the housing of the optical connector of FIG. 1A is arranged at a tip constraint position.

As shown in FIGS. 1A and 1B, an optical connector 10 is assembled at the tip of an optical fiber 1. In the drawings, a reference sign 1A is appended to an optical fiber having a connector in which the optical connector 10 is assembled at the tip of the optical fiber 1.

Figure 3:
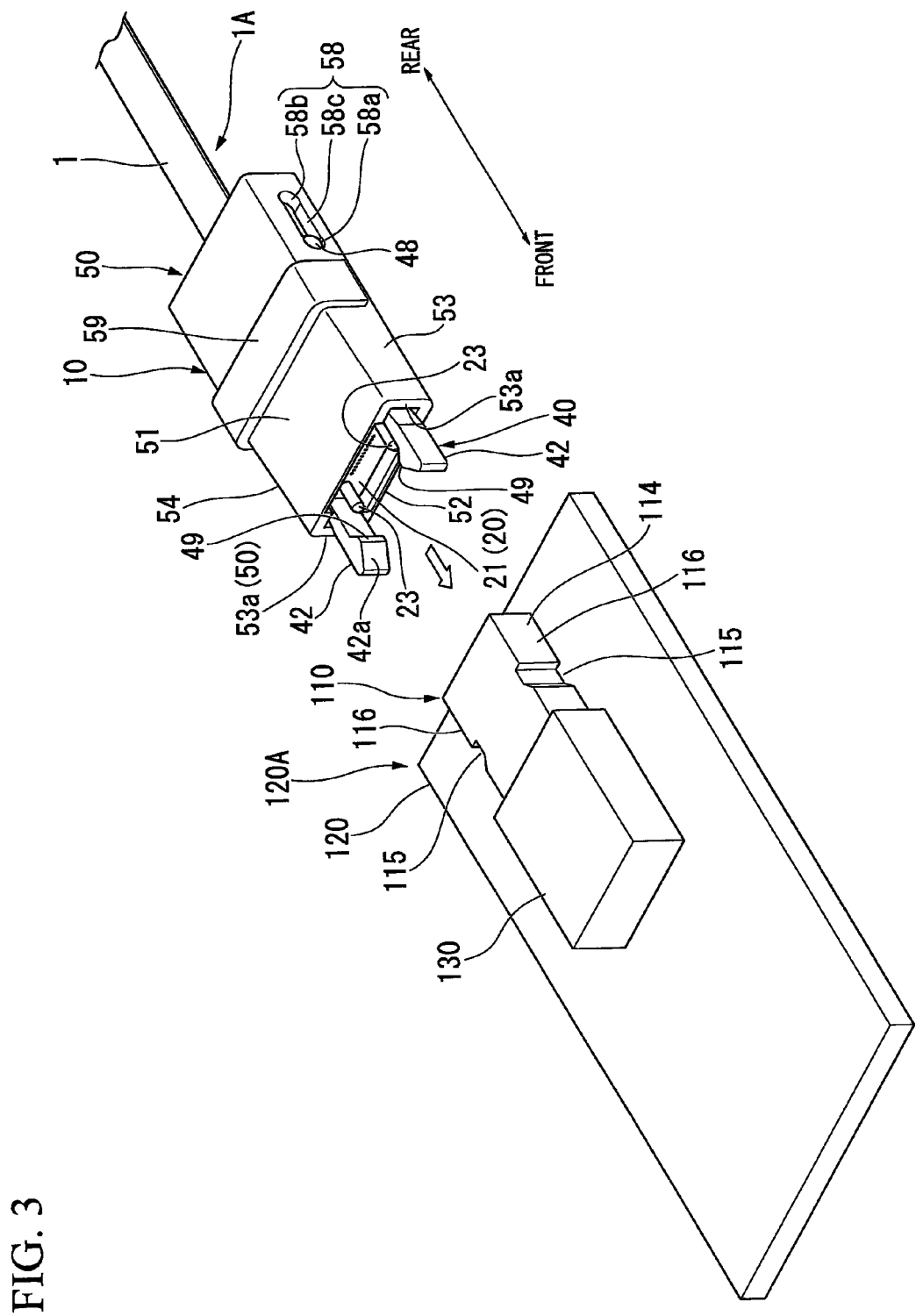
FIG. 3 is a perspective view illustrating a connector connection system of one embodiment of the present invention.
Figure 4:
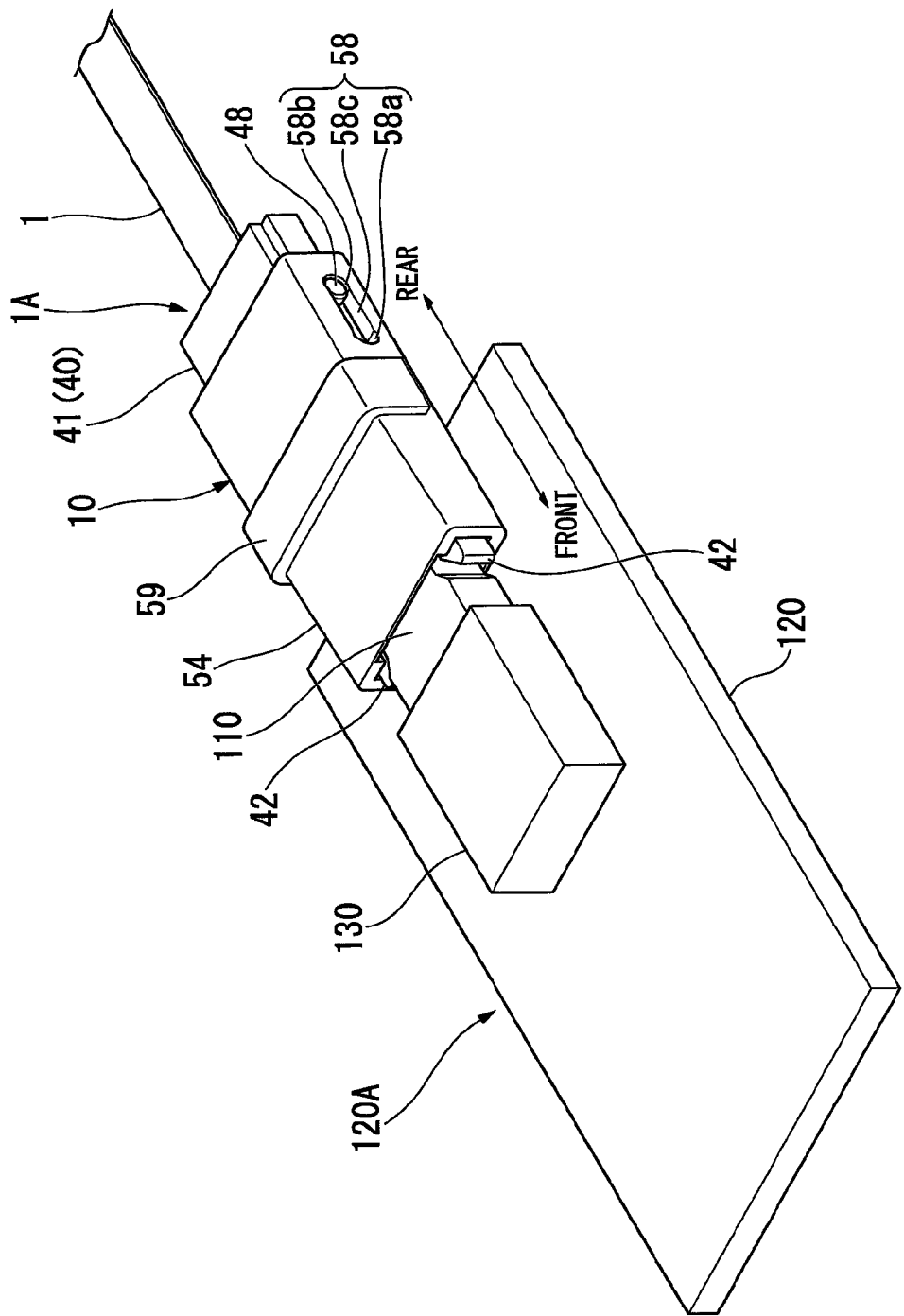
FIG. 4 is a perspective view showing a state where an optical connector of a tip of an optical fiber having a connector has been fastened (connected) to a receiving-side optical connector of a board with a connector, in the connector connection system of FIG. 3.

As shown in FIGS. 3 and 4, the optical connector 10 can be pushed toward a receiving-side optical connector (plug) 110, and thereby fastened and connected to the receiving-side optical connector 110 by the push-on method.

As shown by arrows in FIGS. 1A, 1B, 3, and 4, the optical connector 10 will be described, with the side where tips of a pair of elastic pieces 42 of an engaging member 40 (refer to FIG. 2) provided at the optical connector 10 are located being defined as the front and the side opposite to the front being defined as the rear. Additionally, in FIGS. 5, 6A, 6B, 7A, and 7B, the optical connector 10 will be described with the left being defined as the front and the right being defined as the rear.

Figure 2:
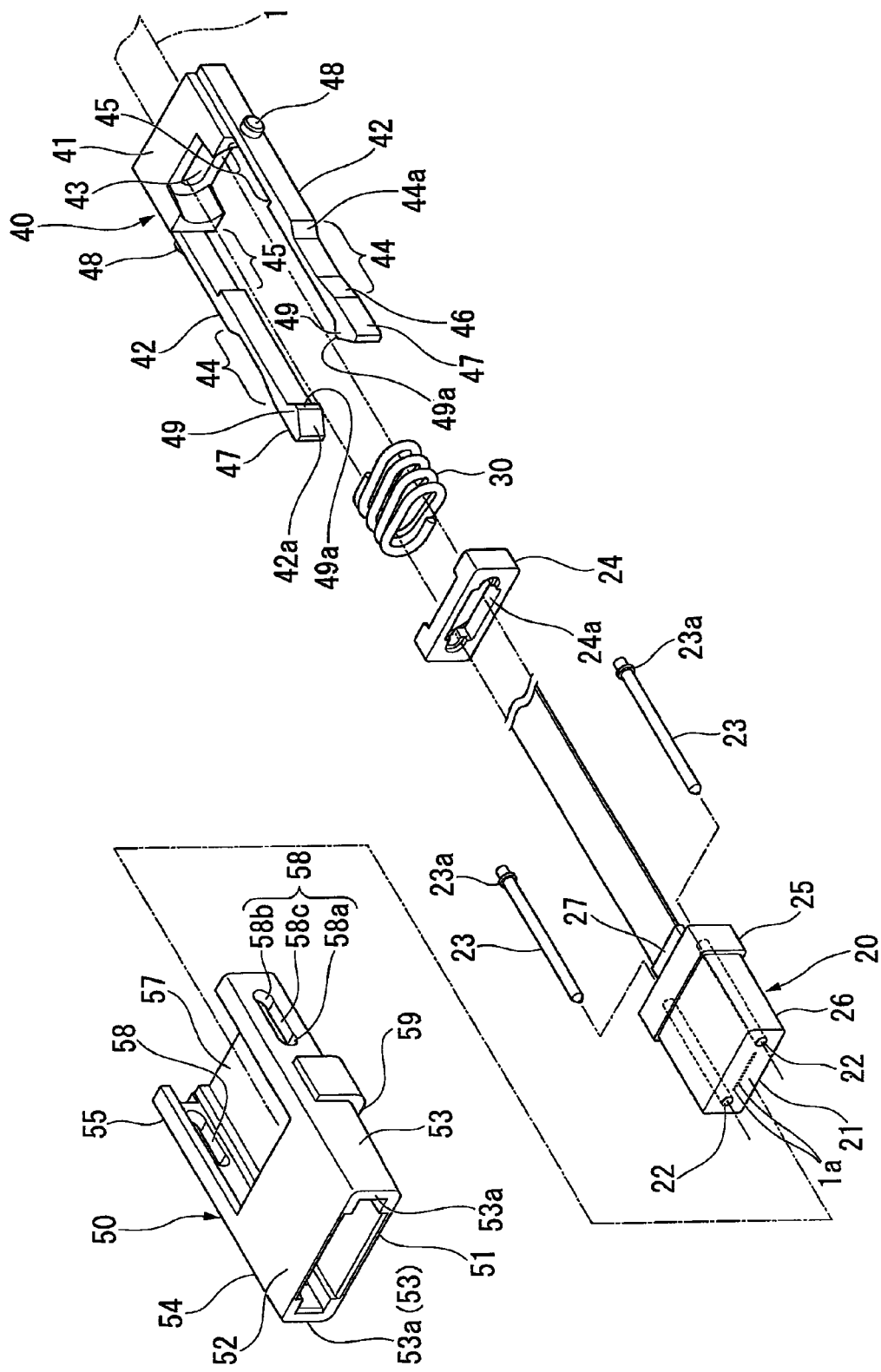
FIG. 2 is an exploded perspective view of the optical connector of FIGS. 1A and 1B.

As shown in FIGS. 1A, 1B, and 2, the optical connector 10 has a ferrule 20 attached to the tip of the optical fiber 1, a biasing member (specifically, a coil spring) 30 arranged at the rear of the ferrule 20, the engaging member 40 which has the pair of elastic pieces 42, and a tubular housing 50 externally fitted to the engaging member 40 so as to be movable back and forth.

As shown in FIG. 2, the engaging member 40 is a U-shaped member in which the pair of elastic pieces 42 extends from both sides of a plate-shaped biasing member receiving portion 41 toward one surface of the biasing member receiving portion 41. The engaging member 40 is externally fitted to the optical fiber 1 which has passed through a fiber insertion hole 43 which penetrates the biasing member receiving portion 41. The pair of elastic pieces 42 extends from the biasing member receiving portion 41 in an orientation along the axis of the fiber insertion hole 43.

Figure 5:
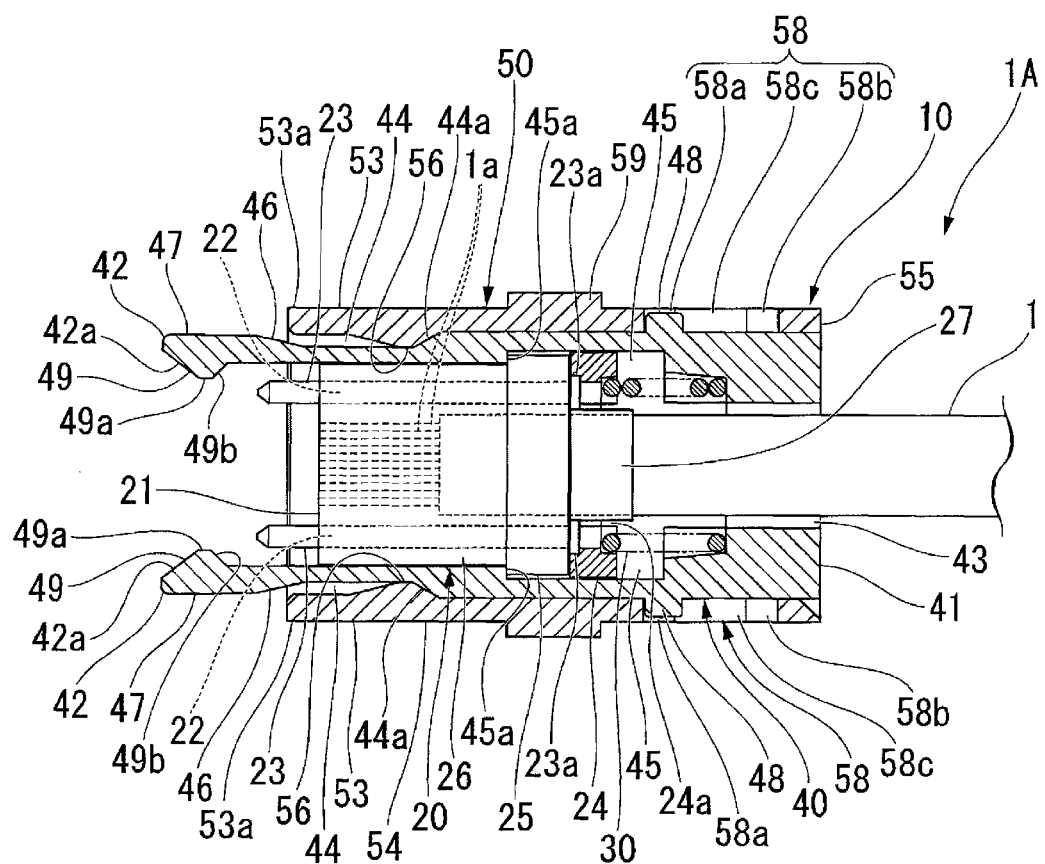
FIG. 5 is a top sectional view illustrating the internal structure of the optical connector of FIGS. 1A and 1B.

As shown in FIG. 5 and the like, the engaging member 40 is provided in such an orientation that the pair of elastic pieces 42 extends to the front side from the biasing member receiving portion 41 arranged at the rear of the biasing member 30 which is a coil spring externally fitted to the optical fiber 1. The ferrule 20 and the biasing member 30 are arranged between the pair of elastic pieces 42 of the engaging member 40.

Specifically, the ferrule 20 is an MT (Mechanically Transferable)-type optical connector (F12-type optical connector established in JIS C 5981). Hereinafter, the ferrule 20 will also be referred to as an MT ferrule.

As shown in FIG. 2, the ferrule (MT ferrule) 20 is a plastic optical connector whose appearance is plate-shaped. The ferrule 20 has a tip face (joining end face) 21 for butting and joining at the front thereof. A flange portion 25 is provided at a rear end portion of the ferrule 20 so as to protrude therefrom. The flange portion 25 is provided at the entire circumference of the rear end portion of the ferrule 20.

In the ferrule (MT ferrule) 20, the cross-sectional shape thereof orthogonal to the front-rear direction is a rectangular shape, and the tip face 21 also has a rectangular shape.

The optical fiber 1 is specifically an optical fiber ribbon. The ferrule 20 is fixed to the tip of the optical fiber 1. The tip faces of bare optical fibers 1a which are led out to the tip of the optical fiber 1 are exposed to the tip face 21 of the ferrule 20. A plurality of bare optical fibers 1a of the optical fiber 1 is arranged and provided along the direction of the spacing between a pair of guide pin holes 22 between the pair of guide pin holes 22 which penetrate the ferrule 20 back and forth, and opens to both longitudinal ends of the tip face 21.

In addition, although the optical fiber 1 of the illustrated example is a 12-core optical fiber ribbon, the number of cores of the optical fiber ribbon is not particularly limited.

Additionally, a tubular boot 27 attached to the ferrule 20 is provided at the rear of the ferrule 20 so as to protrude therefrom, and the optical fiber 1 is made to pass through the inside of the boot 27. The boot 27 is a flexible tubular member formed from rubber or the like.

As shown in FIGS. 1A and 3, guide pins 23 which are respectively inserted and fitted into the pair of guide pin holes 22 (refer to FIG. 2) which penetrate the ferrule 20 protrude toward the tip face (joining end face) 21 for butting and joining of the ferrule (MT ferrule) 20. As shown in FIG. 5, a slip-out preventing flange 23a capable of abutting on the rear end face of the ferrule 20 is provided at the outer periphery of a rear end portion of each guide pin 23 which is made to protrude to the rear side (the side opposite to the tip face 21) of the ferrule 20. The position of the guide pins 23 where the slip-out preventing flange 23a abuts the ferrule 20 becomes the movement limit position of the ferrule 20 to the front side. Additionally, a pin clamp 24 fixed to the rear end portion of each guide pin 23 is provided at the rear of the ferrule 20.

The optical connector 10 of the illustrated example includes the guide pins 23 and the pin clamp 24.

As shown in FIGS. 2 and 5, a fiber insertion hole 24a for allowing the optical fiber 1 to pass therethrough is provided so as to penetrate the pin clamp 24. As shown in FIG. 5, the pin clamp 24 is externally fitted to the optical fiber 1 which has passed through the fiber insertion hole 24a, and is interposed between the ferrule 20 and the biasing member 30.

As shown in FIGS. 1A, 1B, and 2, the housing 50 has a pair of face plate portions 51 and 52 (a first face plate portion 51 and a second face plate portion 52) provided parallel to each other, and a pair of rib-shaped side wall portions 53 provided so as to protrude parallel to each other along a pair of long sides of a rectangular plate-shaped first face plate portion 51. The pair of side wall portions 53 is provided at the first face plate portion 51 so as to protrude therefrom over the entire longitudinal length of the first face plate portion. The second face plate portion 52 bridges the ends of the pair of side wall portions 53 opposite to the first face plate portion 51. Here, the second face plate portion 52 of the housing 50 of the illustrated example is provided within the range from a front end portion of the housing 50 to the middle portions of the pair of side wall portions 53 in the extending direction thereof. The housing 50 of the illustrated example has a tubular portion 54 in which the ends of the pair of side wall portions 53 opposite to the first face plate portion 51 are bridged by the second face plate portion 52.

The tubular portion 54 is formed in the shape of a flat angled tube. The pair of side wall portions 53 is located at both ends of the tubular portion 54 in the longitudinal direction thereof in section. The portion of the housing 50 on the rear side of the tubular portion 54 is used as a guide piece portion 55 having a U-shaped section.

As shown in FIGS. 2, 5, and the like, the housing 50 is externally fitted to the engaging member 40 with the direction of the spacing between the pair of side wall portions 53 being aligned with the direction of the spacing between a pair of elastic pieces 42 of the engaging member 40.

At the middle portions of the pair of elastic pieces 42 of the engaging member 40 in the longitudinal direction (front-rear direction) thereof, recesses 44 which extend in the longitudinal direction of the elastic pieces 42 are formed at sides opposite (hereinafter referred to as external surface sides) to the mating elastic pieces 42 which face each other in the direction of the spacing between the pair of elastic pieces 42.

The housing 50 has stopper protrusions 56 which protrude from the side wall portions 53 on the internal surface sides of the housing at positions slightly deviated toward the rear from the front end of the housing, and the stopper protrusions 56 are inserted into the recesses 44 of the pair of elastic pieces 42. The stopper protrusions 56 are inserted into the recesses 44 so as to be movable in the longitudinal direction of the elastic pieces 42.

Additionally, as shown in FIGS. 1A, 1B, 5, and the like, the rear end portions of the side wall portions 53 on both sides of the housing 50 are formed with long holes 58 which are elongated along the extending direction (front-rear direction) of the side wall portions 53, and housing locking projections 48, which are provided on both sides of the engaging member 40 so as to protrude therefrom, are inserted into the long holes 58. As shown in FIGS. 2 and 5, in the engaging member 40 of the illustrated example, the housing locking projections 48 protrude toward the external surface sides of the elastic pieces 42 from near the boundary positions between the biasing member receiving portion 41 and the elastic pieces 42. Here, the protruding positions of the housing locking projections 48 are not limited to the positions of the illustrated example.

As shown in FIGS. 1A, 1B, 5, and the like, the housing locking projections 48 are movable in the extending direction of the long holes 58. The movable range of the housing 50 with respect to the engaging member 40 in the front-rear direction (in other words, the movable range along the longitudinal direction of the elastic pieces 42) is set depending on the dimension of the long holes 58 in the extending direction thereof.

As shown in FIGS. 1A, 3, 5, 8A, and the like, the position when the housing locking projections 48 have fitted into (engaged with) front locking hole portions 58a formed by slightly extending front end portions of the long holes 58 becomes the rear movement limit position of the housing 50 with respect to the engaging member 40. The position (rear movement limit position; position shown in FIG. 5) of the housing 50 with respect to the engaging member 40 at this time will also be referred to as a standby position.

Figure 8A:
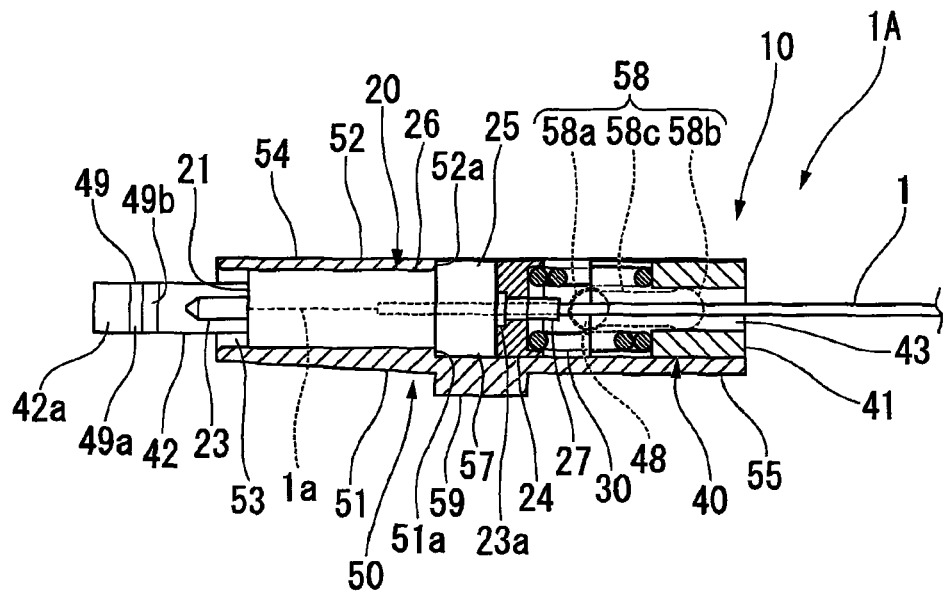
FIG. 8A is a front sectional view illustrating the internal structure of the optical connector of FIGS. 1A and 1B, and showing an initial state where the housing is at a standby position for an engaging member.
Figure 8B:
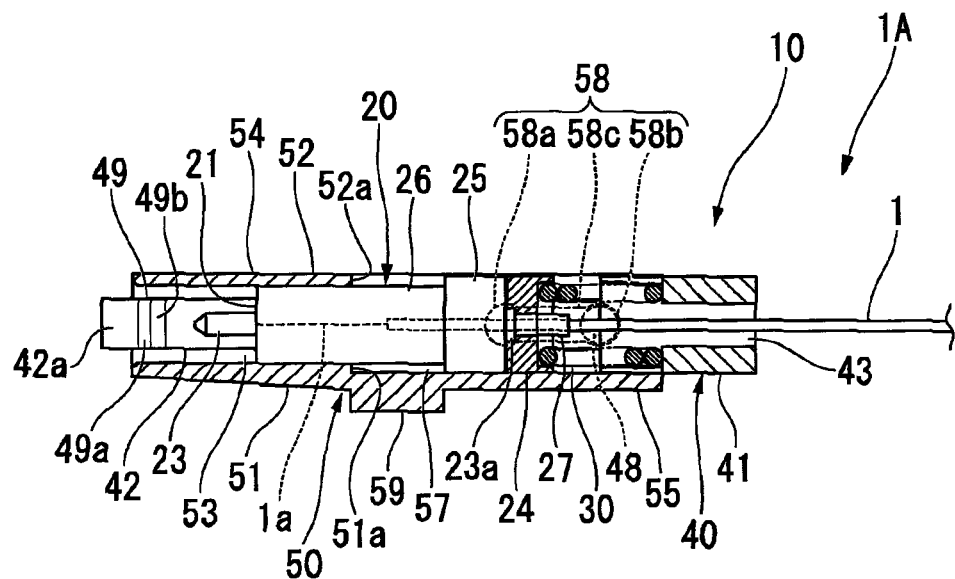
FIG. 8B is a front sectional view illustrating the internal structure of the optical connector of FIGS. 1A and 1B, and showing a state where the housing is arranged at the tip constraint position.

Additionally, as shown in FIGS. 1B, 8B, and the like, the position when the housing locking projections 48 have fitted into (engaged with) rear locking hole portions 58b formed by slightly extending rear end portions of the long holes 58 becomes the forward movement limit position of the housing 50 with respect to the engaging member 40.

The housing locking projections 48 can move between the front locking hole portions 58a and the rear locking hole portions 58b through passage portions 58c between the front locking hole portions 58a and rear locking hole portions 58b of the long holes 58.

Here, the housing 50 is locked to the engaging member 40 at the standby position by the fitting between the front locking hole portions 58a and the housing locking projections 48, as shown in FIG. 3, in a state (initial state) where the optical connector 10 is not fastened by the receiving-side optical connector 110 (combination), but is spaced apart from the receiving-side optical connector 110.

As shown in FIG. 5, the housing 50 makes the stopper protrusions 56 provided at the pair of side wall portions 53 which protrude therefrom abut the elastic pieces 42 of the engaging member 40, respectively. Additionally, the housing 50 makes the portions of the pair of side wall portions 53 located on the rear side of the stopper protrusions 56 abut the engaging member 40. The portions (portions which abut the elastic pieces 42 from the external surface sides thereof) of the housing 50, which abut the pair of elastic pieces 42 of the engaging member 40 from both sides in the direction of the spacing between the pair of elastic pieces 42, regulate an increase in the distance between the pair of elastic pieces 42.

As shown in FIGS. 2, 5, and the like, the ferrule 20 is arranged between the pair of elastic pieces 42 such that the longitudinal direction (hereinafter also referred to as a width direction) of the section (section orthogonal to the front-rear) thereof is aligned with the direction of the spacing between a pair of elastic pieces 42 of the engaging member 40.

The portions of the flange portion 25 of the ferrule 20, which are located on both sides of the ferrule 20 in the width direction thereof, are inserted into flange portion storage recesses 45 formed on mutually facing sides (hereinafter referred to as internal surface sides) of base end portions (rear end portions) of the pair of elastic pieces 42 of the engaging member 40. Additionally, a plate-shaped portion 26 of the ferrule 20 on the tip side of the flange portion 25 is arranged at portions on the front side of the flange portion storage recesses 45 of the pair of elastic pieces 42. Here, the ferrule 20 is arranged nearer the rear side (on the side of the biasing member receiving portion 41) than protruding claws 49 which are provided on the internal surface sides of tip portions of the respective elastic pieces 42 so as to protrude therefrom, between the pair of elastic pieces 42.

The separation distance between the portions of the pair of elastic pieces 42 on the front side of the flange portion storage recesses 45 is aligned with the dimension of the plate-shaped portion 26 of the ferrule 20 in the width direction thereof. The pair of elastic pieces 42 positions the ferrule 20 in the longitudinal direction of the section of the housing 50 (the direction of the spacing between the pair of side wall portions 53).

The fact that the portions of the housing 50 which abut the pair of elastic pieces 42 from the external surface sides thereof regulate an increase in the distance between the pair of elastic pieces 42 effectively contributes to stable maintenance of a state where the ferrule 20 is positioned by the pair of elastic pieces 42 of the engaging member 40.

As shown in FIG. 5 and the like, front end portions of the recesses 44 of the elastic pieces 42 of the engaging member 40 are formed with inclined surfaces 46 which incline to the external surface sides of the elastic pieces 42 from the rear side toward the front side. The inclined surfaces 46 are edges of front ends of the recesses 44 of the elastic pieces 42.

Figure 7A:
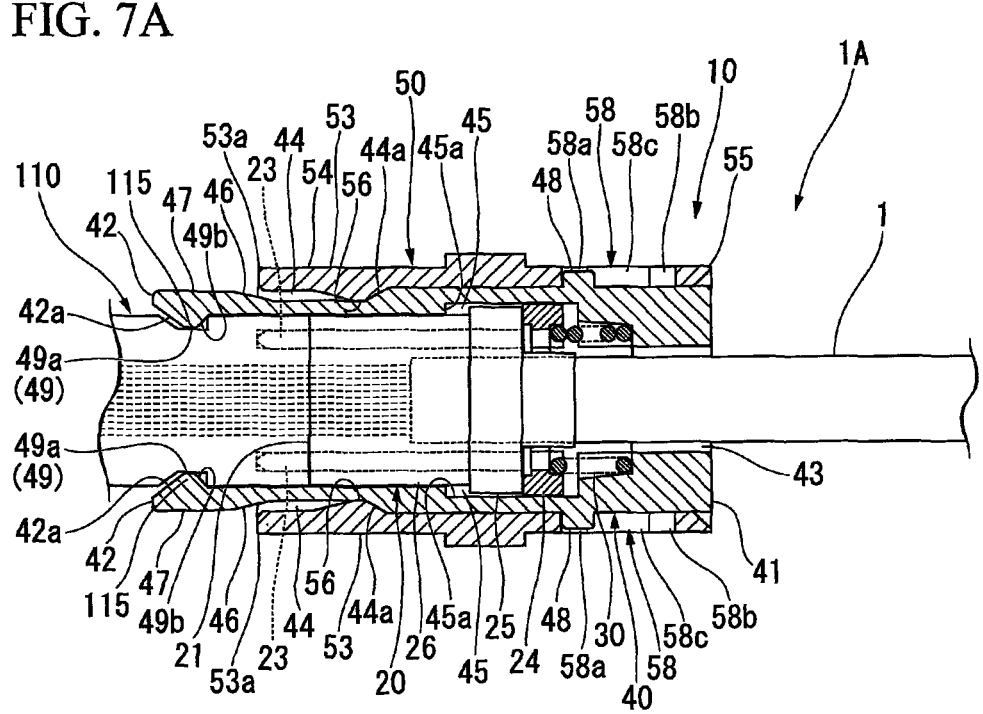
FIG. 7A is a view illustrating the operation of fastening the optical connector of FIGS. 1A and 1B to the receiving-side optical connector.
Figure 7B:
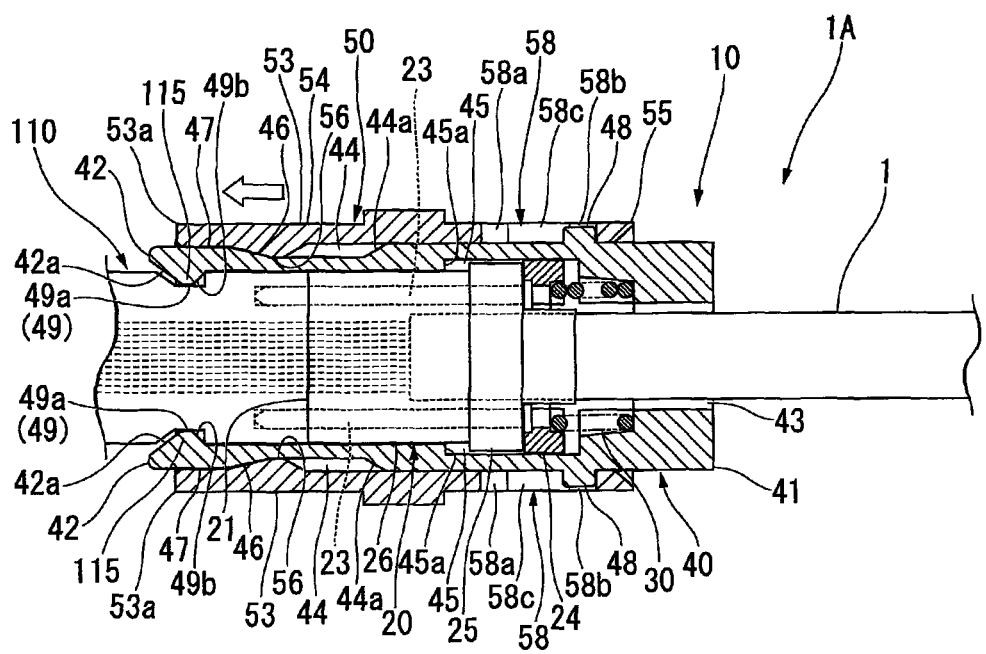
FIG. 7B is a view illustrating the operation of fastening the optical connector of FIGS. 1A and 1B to the receiving-side optical connector.

As shown in FIG. 7B, slip-out of the housing 50 from the tips of the elastic pieces 42 is regulated as the stopper protrusions 56 abut the inclined surfaces 46 of the elastic pieces 42. Additionally, the housing 50 is at the forward movement limit position as the stopper protrusions 56 abut the inclined surfaces 46 of the elastic pieces 42, and simultaneously, as shown in FIG. 1B and the like, the housing locking projections 48 of the engaging member 40 fit into (engage with) the rear locking hole portions 58a formed by slightly extending the rear ends of the long holes 58.

As shown in FIG. 5 and the like, the stopper protrusions 56 of the housing 50 abut stepped faces 44a which are the edges of the rear ends of the recesses 44 of the elastic pieces 42 of the engaging member 40 when the housing locking projections 48 have fitted into the front locking hole portions 58a of the long holes 58 (when the housing is at the rear movement limit position).

The stopper protrusions 56 of the housing 50 are able to selectively abut the inclined surfaces 46 which are the edges of the front ends of the recesses 44 of the elastic pieces 42 of the engaging member 40 and the stepped faces 44a which are the edges of the rear ends of the recesses 44, by the front-rear movement of the housing 50 with respect to the engaging member 40. The housing 50 and the elastic pieces 42 of the engaging member 40 constitute a latch structure in which the housing and the elastic pieces engage with each other when the stopper protrusions 56 of the housing 50 have abutted the inclined surfaces 46 of the elastic pieces 42 and when the stopper protrusions 56 abut the stepped faces 44a of the rear ends of the recesses 44 of the elastic pieces 42. The stopper protrusions 56 of the housing 50 function as engaging protrusions which abut and engage with the edges of the front ends or the edges of the rear ends in the recesses (engaging recesses) 44 of the elastic pieces 42.

Additionally, by the front-rear movement of the housing 50 with respect to the engaging member 40, the edges of the front ends or the edges of the rear ends in the long holes 58 can be made to selectively abut the housing locking projections 48 of the engaging member 40, and to engage with the engaging member 40. The housing 50 and the engaging member 40 constitute a latch structure in which the housing and the engaging member engage with each other when the housing locking projections (engaging protrusions) 48 of the engaging member 40 abut the edges of the front ends of the long holes 58 of the housing 50 and when the housing locking projections 48 abut the edges of the rear ends of the long holes 58. The long holes 58 of the housing 50 function as engaging recesses for causing the housing locking projections (engaging protrusions) 48 of the engaging member 40 to engage with the housing 50.

The portions of the tip portions of the elastic pieces 42 on which the inclined surfaces 46 are formed and the portions of the elastic pieces on the tip side (front side) of these portions become slip-out preventing protrusions 47 which regulate slip-out of the housing 50 to the front side from the elastic pieces 42.

As shown in FIG. 7B, when the housing 50 has been arranged in the forward movement limit position, the stopper protrusions 56 abut the tip portions of the pair of elastic pieces 42 from the external surface sides thereof, thereby regulating an increase in the distance between the tip portions of the pair of elastic pieces 42. Additionally, since the portions (front end abutting wall portions 53a) of the side wall portions 53 located on the front end side of the stopper protrusions 56 abut the tip portions of the pair of elastic pieces 42 from the external surface sides thereof, the housing 50 can reliably regulate an increase in the distance between the tip portions of the pair of elastic pieces 42.

The position (forward movement limit position) of the housing 50 shown in FIG. 7B will also be referred to as a tip constraint position.

As shown in FIGS. 8A and 8B, the plate-shaped portion 26 of the ferrule 20 is stored in the tubular portion 54 of the housing 50. The thickness dimension of the plate-shaped portion 26 of the ferrule 20 is greater than the dimension of the elastic pieces 42 of the engaging member 40 in the width direction thereof (the direction of the spacing between the first face plate portion 51 and second face plate portion 52 of the housing 50; up-and-down direction in FIGS. 8A and 8B). The spacing (separation distance) between the first face plate portion 51 and second face plate portion 52 of the housing 50 is aligned with the thickness dimension of the plate-shaped portion 26 of the ferrule 20. The plate-shaped portion 26 of the ferrule 20 is positioned by the first face plate portion 51 and second face plate portion 52 of the housing 50 in the thickness direction (the direction of the spacing between the first face plate portion 51 and the second face plate portion 52) of the tubular portion 54 of the housing 50.

As shown in FIGS. 2, 8A, and 8B, the flange portion 25 of the rear end of the ferrule 20 is arranged at a flange portion guide groove 57 formed in the portion of the first face plate portion 51 of the housing 50 which is located at the guide piece portion 55. Thereby, the ferrule 20 is provided in the housing 50 in a posture where the front-rear direction thereof is aligned with the axis direction (front-rear direction) of the tubular portion 54 of the housing 50.

The flange portion guide groove 57 extends up to the rear end of the first face plate portion 51 along the axis direction (front-rear direction) of the tubular portion 54 of the housing 50.

As shown in FIG. 5, the ferrule 20 is elastically biased to the front side toward the engaging member 40 by the biasing member 30. Also, the portions of the flange portion 25 of the ferrule 20 which are inserted into the flange portion storage recesses 45 of the pair of elastic pieces 42 of the engaging member 40 are made to abut the stepped faces 45a, which are located at the boundaries between the flange portion storage recesses 45 and the portions on the front side of the storage recesses in the elastic pieces 42, from the rear side thereof. The stepped faces 45a function as regulating members which regulate the movement of the ferrule 20 with respect to the engaging member 40, to the front side from a position where the flange portion 25 of the ferrule 20 abuts the stepped faces 45a from the rear side thereof.

Here, the extending dimension of the flange portion storage recesses 45 in the longitudinal direction of the elastic pieces 42 is set to such a size that the clearance which allows the movement of the flange portion 25 of the ferrule 20 relative to the engaging member 40 in the longitudinal direction (front-rear direction of the connector) of the elastic pieces 42 can be secured. The ferrule 20 is adapted to be movable along the longitudinal direction (front-rear direction) of the pair of the elastic pieces 42 with respect to the engaging member 40. The ferrule 20 is adapted to be capable of being pushed in to the rear side from a position where the flange portion 25 thereof abuts the stepped faces 45a, against the biasing force of the biasing member 30 (refer to FIGS. 7A and 7B).

Additionally, the ferrule 20 is adapted to be movable in the axis direction of the tubular portion 54 with respect to the housing 50.

Here, for example, as shown in FIG. 7B, even if the housing 50 is arranged at the tip constraint position (forward movement limit position) with respect to the engaging member 40, and the ferrule 20 is pushed in to the rear side from the position where the flange portion 25 abuts the stepped faces 45a due to the butting against the receiving-side optical connector 110, sufficient length for the insertion length of the plate-shaped portion 26 with respect to the tubular portion 54 is secured so that the plate-shaped portion 26 not slip out from the tubular portion 54 of the housing 50. For this reason, the ferrule 20 can always maintain a state where the plate-shaped portion 26 thereof is stored in the tubular portion 54 of the housing 50.

When the position of the ferrule 20 relative to the housing 50 in the front-rear direction of the connector changes, the plate-shaped portion 26 slides on the internal surface of the tubular portion 54 (specifically, the surfaces of the pair of face plate portions 51 and 52 inside the tubular portion 54) of the housing 50. Additionally, at this time, the ferrule 20 slides on the guide piece portion 55 while the flange portion 25 is guided by the flange portion guide groove 57 of the guide piece portion 55 of the housing 50.

As shown in FIGS. 8A and 8B, a stepped face 51a formed at the boundary position between the flange portion guide groove 57 and the portion on the front side of the flange portion guide groove 57 in the first face plate portion 51 of the housing 50, and a rear end face 52a of the second face plate portion 52 coincides with the position of the tubular portion 54 in the axis direction (front-rear direction) thereof. In a state (initial state) where the optical connector 10 is not fastened to the receiving-side optical connector 110, but spaced apart from the receiving-side optical connector 110, the flange portion 25 of the ferrule 20 abuts the stepped face 51a of the housing 50 and the rear end face 52a of the second face plate portion 52.

The stepped face 51a of the housing 50 and the rear end face 52a of the second face plate portion 52 function as ferrule engaging portions which are engageable with the flange portion 25 of the ferrule 20 from the front side.

Since the second face plate portion 52 of the housing 50 does not cover the flange portion 25 of the ferrule 20, the second face plate portion can be formed thinly compared to the first face plate portion 51 without forming the flange portion guide groove 57 unlike the first face plate portion 51. This effectively contributes to increasing the overall thinness of the housing 50 and the optical connector 10.

Additionally, as shown in FIGS. 3 and 5, in the optical connector 10, the tip portions of the pair of elastic pieces 42 of the engaging member 40 protrude from the front end of the housing 50 at the standby position.

As shown in FIGS. 3 and 4, the operation of fastening the optical connector 10 to the receiving-side optical connector 110 is performed, for example, as an operator presses the housing 50 at the standby position toward the receiving-side optical connector 110 with his/her fingers.

As shown in FIGS. 3, 4, and 6, the receiving-side optical connector 110 is formed in the shape of a substantially rectangular plate. The receiving-side optical connector 110 has a tip face 111 for abutting and joining on which the tip face 21 of the ferrule (MT ferrule) 20 of the optical connector 10 is abutted.

Figure 6A:
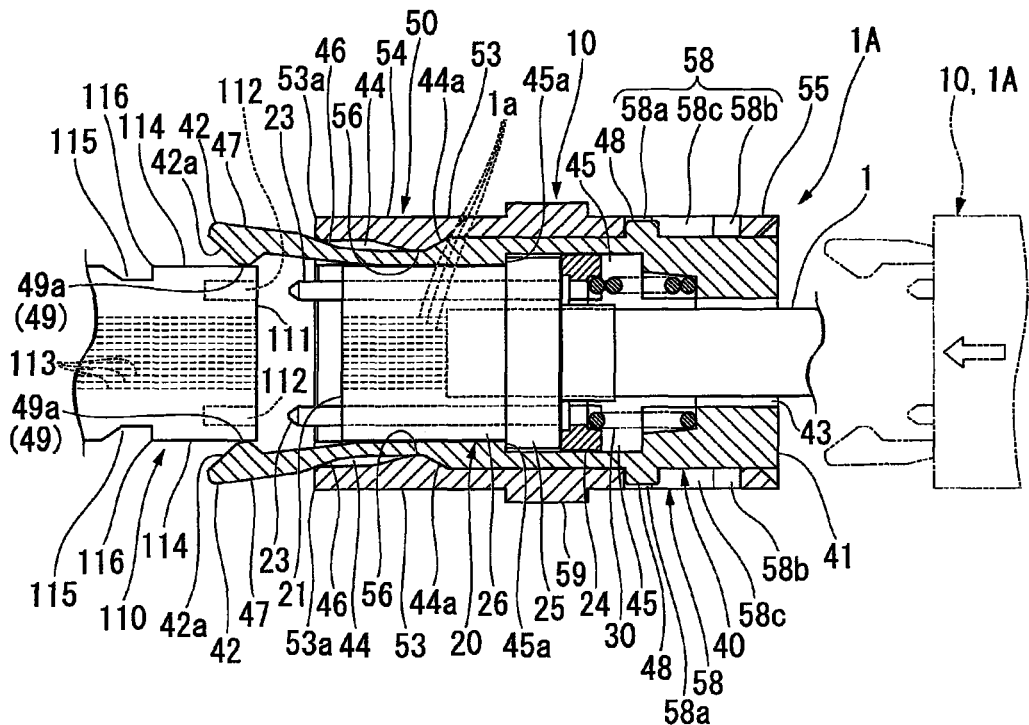
FIG. 6A is a view illustrating the operation of fastening the optical connector of FIGS. 1A and 1B to the receiving-side optical connector.
Figure 6B:
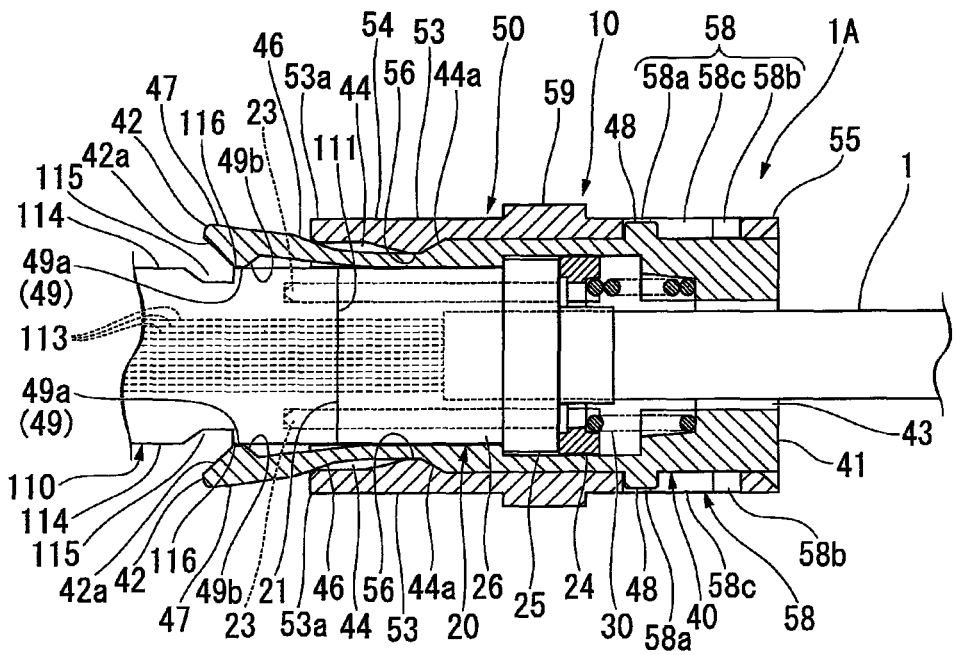
FIG. 6B is a view illustrating the operation of fastening the optical connector of FIGS. 1A and 1B to the receiving-side optical connector.

The section of the receiving-side optical connector 110 perpendicular to the front-rear direction (the tip face 111 side is the front and the side opposite thereto is the rear; right-left direction in FIGS. 6A and 6B) has a rectangular shape, and the tip face 111 is formed in a rectangular shape which coincides with the tip face 21 of the ferrule 20 of the optical connector 10.

An operating protrusion 59 for facilitating a pressing operation of the housing 50 is provided on the outer peripheral surface of the housing 50 so as to protrude therefrom. In the optical connector 10 of the illustrated example, the operating protrusion 59 becomes a protruding strip which extends in the width direction (the longitudinal direction of a section perpendicular to the axis of the tubular portion 54; the direction of the spacing between the pair of side wall portions 53) of the housing 50 on the outside surface of the first face plate portion 51 of the housing 50. Additionally, the operating protrusion 59 is provided on the middle portion of the housing 50 in the front-rear direction (direction along the axis of the tubular portion 54) thereof so as to protrude therefrom. For this reason, the operating protrusion 59 can be appropriately used for the operation of pressing the housing 50 to the front side in the operation of fastening the optical connector 10 to the receiving-side optical connector 110. Additionally, the operating protrusion 59 can also be appropriately used for the extracting operation of performing an operation to pull the housing 50 of the optical connector 10 in the state of being fastened to the receiving-side optical connector 110 to the rear side, and extracting the optical connector 10 from the receiving-side optical connector 110.

Side faces 114 on both sides in the long side direction of a section of the receiving-side optical connector 110 are formed with engaging recesses 115 for making the protruding claws 49 of the tips of the pair of elastic pieces 42 of the engaging member 40 of the optical connector 10 enter thereinto and engage with the receiving-side optical connector 110. When the optical connector 10 is fastened to the receiving-side optical connector 110, the protruding claws 49 made to enter the engaging recesses 115 on both sides of the receiving-side optical connector 110 are made to engage with locking portions (locking protrusions) 116 on the front side of the engaging recesses 115 in the receiving-side optical connector 110.

A pair of guide pin holes 112 formed parallel to each other in the receiving-side optical connector 110 opens at both ends of the longitudinal direction of the tip face 111 of the receiving-side optical connector 110. Additionally, the tip faces of optical fibers 113 fixed to the receiving-side optical connector 110 are exposed to a position between the pair of guide pin holes 112 of the tip face 111. As shown in FIG. 6A or the like, the receiving-side optical connector 110 is provided with the same number of optical fibers 113 as the number of the bare optical fibers 1a which are fixed to the ferrule 20 of the optical connector 10 and is exposed in the tip face 21.

The spacing between the pair of guide pin holes 112 coincides with the spacing between the pair of guide pins 23 which protrude from the tip face 21 of the ferrule 20 of the optical connector 10 and the spacing between the pair of guide pin holes 22. Additionally, the positional relationship of the tip face of each optical fiber 113 exposed to the tip face 111 of the receiving-side optical connector 110 with respect to the pair of guide pin holes 112 coincides with the positional relationship between the tip faces of the bare optical fibers 1a at the tip face 21 of the ferrule 20 of the optical connector 10, and the guide pins 23.

By inserting and fitting the pair of guide pins 23 which protrude from the tip face 21 of the ferrule 20 into the pair of guide pin holes 112 of the receiving-side optical connector 110, the ferrule 20 of the optical connector 10 can be positioned with respect to the receiving-side optical connector 110 with high precision, and be connected thereto through butting.

The butting connection of the ferrule 20 with respect to the receiving-side optical connector 110 is realized by inserting and fitting the pair of guide pins 23 into the pair of guide pin holes 112 of the receiving-side optical connector 110 and butting the tip face 21 against the tip face 111 of the receiving-side optical connector 110. When the ferrule 20 is butting-connected to the receiving-side optical connector 110, the plurality of bare optical fibers 1a exposed to the tip face 21 of the ferrule 20 is respectively positioned with respect to the optical fibers 113 exposed to the tip face 111 of the receiving-side optical connector 110 with high precision, and is connected thereto through butting.

Figure 9:
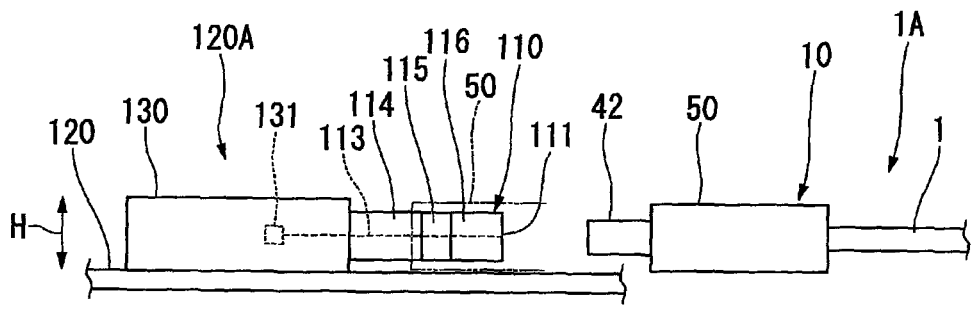
FIG. 9 is a front sectional view illustrating the connector connection system of FIGS. 3 and 4.

As shown in FIG. 9, the receiving-side optical connector 110 of the illustrated example is attached to a photoelectric conversion unit 130 mounted on a circuit board 120, and is provided parallel to the circuit board 120 so as to protrude from a side face of the photoelectric conversion unit 130. Additionally, as shown in FIG. 4 and the like, the receiving-side optical connector 110 is provided so as to be spaced apart from the circuit board 120. The tip face 111 of the receiving-side optical connector 110 is the end face of a protruding end of the receiving-side optical connector 110 which protrudes from the photoelectric conversion unit 130. When the optical connector 10 is fastened to the receiving-side optical connector 110, the first face plate portion 51 or second face plate portion 52 of the housing 50 is inserted in between the receiving-side optical connector 110 and the circuit board 120, and the tip portion of the receiving-side optical connector 110 is stored in the tubular portion 54.

The tip face 111 of the receiving-side optical connector 110 extends in a direction substantially orthogonal to (perpendicular to or slightly inclining with respect to a virtual plane perpendicular to the circuit board 120) the circuit board 120.

The optical fibers 113 exposed to the tip face 111 of the receiving-side optical connector 110 and the bare optical fibers 1a exposed to the tip face 21 of the ferrule 20 of the optical connector 10 are optically connected to each other using an optical axis in the direction along the circuit board 120 by butting portions which are butted against each other.

FIGS. 3, 4, and 9 show a connector connection system having a configuration in which the optical connector 10 of the tip of an optical fiber 1A with a connector is fastened and connected to the receiving-side optical connector 110 of a board 120A with a connector having a configuration in which the receiving-side optical connector 110 is attached to the photoelectric conversion unit 130 mounted on the circuit board 120.

As shown in FIG. 9, the portion of each optical fiber 113 which extends from the rear end of the receiving-side optical connector 110 is drawn into the photoelectric conversion unit 130, and the end face thereof is arranged so as to be capable of being optically coupled to an optical element 131 (photoelectric transducer) within the photoelectric conversion unit 130. The optical element 131 is a light emitting element or a light receiving element. Additionally, the optical element 131 is electrically connected to an electronic circuit of the circuit board 130. As the light emitting element, for example, an LD (semiconductor laser element, LD: Laser Diode), an LED (Light Emitting Diode), and the like can be employed. As the light receiving element, for example, a photodiode and the like can be employed.

As shown in FIG. 6A, when the optical connector 10 is advanced toward the receiving-side optical connector 110, first, the front inclined surfaces 42a formed at the tips of the pair of elastic pieces 42 protruding from the front end of the housing 50 abut the edge portion of the outer periphery of the tip face 111 of the receiving-side optical connector 110. Then, through the further advancing of the optical connector 10, the portions of the pair of elastic pieces 42 which protrude from the front end of the housing 50 are mutually pushed open and curvedly deformed (elastically deformed) by the tip portion (near the tip face 111) of the receiving-side optical connector 110, and the protruding claws 49 of the tips of the elastic pieces 42 ride on the side faces 114 on both sides of the receiving-side optical connector 110.

As shown in FIGS. 2 and 5, the protruding claws 49 of the pair of elastic pieces 42 are protrusions which protrude toward the facing elastic pieces 42 at the tip portions of the elastic pieces 42, and are triangular in plan view.

The pair of elastic pieces 42 is formed with the front inclined surfaces 42a which gradually approach the facing elastic pieces 42 from the tip portions of elastic pieces toward apexes 49a of the protruding claws 49 located on the rear side of the tip portions.

The optical connector 10 fastened to the receiving-side optical connector 110 is pressed toward the receiving-side optical connector 110 in a posture in which the width direction (the longitudinal direction of a section perpendicular to the axis of the tubular portion 54) of the housing 50 and the width direction of the ferrule 20 are aligned with the width direction which is the direction of the spacing between the side faces 114 on both sides of the receiving-side optical connector 110. As shown in FIG. 6A and the like, the distance between the side faces 114 on both sides of the receiving-side optical connector 110 (the dimension of the receiving-side optical connector 110 in the width direction thereof) is aligned with the dimension of the plate-shaped portion 26 of the ferrule 20 of the optical connector 10 in the width direction thereof. The dimension of the receiving-side optical connector 110 in the width direction thereof is slightly greater than the separation distance between the apexes 49a of protruding claws 49 of the pair of elastic pieces 42 of the engaging member 40 of the optical connector 10 shown in FIG. 5, and is slightly smaller than the separation distance between the tip of the pair of elastic pieces 42 (specifically, the separation distance between the front ends of the front inclined surfaces 42a of the pair of elastic pieces 42).

For this reason, when the optical connector 10 is advanced (advancing operation of the housing 50) toward the receiving-side optical connector 110, first, the front inclined surfaces 42a of the tip portions of the pair of elastic pieces 42 protruding from the front end of the housing 50 abut the edge portion of the outer periphery of the tip face 111 of the receiving-side optical connector 110. At this time, the locking state where the locking member 40 is locked to the housing 50 by the fitting between the housing locking projections 48 and the front locking hole portions 58a of the long holes 58 of the housing 50 is not released, but the locking state is maintained, whereby the engaging member 40 does not retreat with respect to the housing 50. The front locking hole portions 58a of the long holes 58 of the housing 50 function as engaging member locking portions which regulate the retreat of the engaging member 40 with respect to housing 50.

While the locking state of the engaging member 40 with respect to the housing 50 is maintained by the further advancing operation of the housing 50 of the optical connector 10, as shown in FIG. 6A, the portions of the pair of elastic pieces 42 protruding from the front end of the housing 50 are mutually pushed open and curvedly deformed (elastically deformed) by the tip portions of the receiving-side optical connector 110. In the optical connector 10 of the illustrated example, the pair of elastic pieces 42, specifically, the portion on the front side of abutting positions of the stopper protrusions 56 of the housing 50 are curvedly deformed so that the spacing therebetween increases as they go to the front side from the stopper protrusions 56.

The elastic pieces 42 which are curvedly deformed by the tip portion of the receiving-side optical connector 110 abut the front ends (specifically, front ends of front abutting wall portions 53a of the side wall portions 53) of the housing 50 as the protruding claws 49 of the tip portions thereof ride on the side faces 114 of the receiving-side optical connector 110. By a further advancing operation of the housing 50 of the optical connector 10, the front end of the housing 50 presses the tip portions of the pair of elastic pieces 42, thereby moving the optical connector 10 toward the rear side of the receiving-side optical connector 110 along the side faces 114 of the receiving-side optical connector 110 (refer to FIG. 6B). Here, the movement of the housing 50 to the front relative to the pair of elastic pieces 42 is regulated because the front end of the housing abuts the tip portions of the pair of elastic pieces 42.

After the tip face 21 of the ferrule 20 abuts the tip face 111 of the receiving-side optical connector 110 as shown in FIG. 6B, a further advancing operation of the housing 50 of the optical connector 10 can make the protruding claws 49 of the elastic pieces 42 enter the engaging recesses 115 on both sides of the receiving-side optical connector 110 and engage with (refer to FIG. 7A) the locking portions 116.

The locking state where the engaging member 40 is locked to the housing 50 by the fitting between the housing locking projections 48 and the front locking hole portions 58a of the long holes 58 is maintained even when the elastic pieces 42 curvedly deformed by the receiving-side optical connector 110 abut the front end of the housing 50.

In the optical connector 10 of the illustrated example, the inclined surfaces 46 in the pair of elastic pieces 42 curvedly deformed by the tip portion of the receiving-side optical connector 110 abut the front end of the housing 50. The inclination angle of the inclined surfaces 46 with respect to the front-rear direction of the connector when the elastic pieces 42 are curvedly deformed due to the riding of the protruding claws 49 onto the side faces 114 of the receiving-side optical connector 110 is greater than that of the portions of the elastic pieces 42 which extend straight in the front-rear direction of the connector (the axis direction of the tubular portion 54 of the housing 50). The configuration in which the inclined surfaces 46 of the elastic pieces 42 abut the front end of the housing 50 is advantageous in that the advancing movement of the pair of elastic pieces 42 caused by the advancing operation of the housing 50 is reliably realized.

As shown in FIGS. 6B and 7A, in order to fasten and connect the optical connector 10 to the receiving-side optical connector 110, the tip face 21 of the ferrule 20 abuts the tip face 111 of the receiving-side optical connector 110. Thereafter, the advancing operation (the operation of pressing and moving the housing toward the rear end from the tip side of the receiving-side optical connector 110) of the housing 50 is continued, and the housing is arranged at the tip constraint position. The engaging member 40 of the optical connector 10 follows the advancing of the housing 50 after the tip face 21 of the ferrule 20 has abutted the tip face 111 of the receiving-side optical connector 110, and the biasing member 30 is compressively deformed. The housing 50 and the engaging member 40 are moved to the front side of the connector relative to the ferrule 20 made to abut the receiving-side optical connector 110. Here, the advancing operation of the housing 50 is performed against the elastic biasing force of the biasing member 30. Additionally, with the compressive deformation of the biasing member 30, the flange portion 25 of the rear end of the ferrule 20 is spaced apart to the rear side from the stepped faces 45a of the front ends of the flange portion storage recesses 45 of the pair of elastic pieces 42 of the engaging member 40, and the whole ferrule 20 is displaced to the rear side relative to the engaging member 40.

The abutting (butting) between the tip face 21 of the ferrule 20 of the optical connector 10 and the tip face 111 of the receiving-side optical connector 110 is realized by inserting and fitting the pair of guide pins 23 which protrude from the tip face 21 of the ferrule 20 into the pair of guide pin holes 112 of the receiving-side optical connector 110.

The housing 50 of the optical connector 10 at the standby position with respect to the engaging member 40 regulates an increase in the separation distance between the pair of elastic pieces 42 which abuts the housing 50 inside the housing, thereby maintaining the positional accuracy of the ferrule 20 between the pair of elastic pieces 42. Additionally, the tips of the pair of guide pins 23 are substantially determined with respect to the pair of guide pin holes 112 of the receiving-side optical connector 110 as the portions of the pair of elastic pieces 42 which protrudes to the front side from the housing 50 of the optical connector 10 abut the side faces 114 on both sides of receiving-side optical connector 110. Thereby, in the optical connector 10, insertion and fitting of the pair of guide pins 24 into the pair of guide pin holes 112 of the receiving-side optical connector 110 can be performed smoothly.

Additionally, in the optical connector 10 of the illustrated example, the tip face 21 of the ferrule 20 is located nearer the rear side than the front end of the housing 50 at the standby position when the flange portion 25 of the ferrule 20 abuts the stepped faces 45a of the pair of elastic pieces 42 of the engaging member 40. Accordingly, in the optical connector 10, storage of the tip portion of the receiving-side optical connector 110 into the housing 50 is started before the tip face 21 of the ferrule 20 abuts the tip face 111 of the receiving-side optical connector 110.

As shown in FIG. 7A, the pair of elastic pieces 42 of the engaging member 40 of the optical connector 10 is spaced apart from the housing 50 when the protruding claws 49 of the tip portions thereof enters the engaging recesses 115 of the receiving-side optical connector 110. Also, in the optical connector 10, the housing locking projections 48 of the engaging member 40 slip out of the front locking hole portions 58a of the long holes 58 of the housing 50 and enter the passage portions 58c of the long holes 58, by the further advancing operation of the housing 50. In the optical connector 10, as the fitting between the housing locking projections 48 and the front locking hole portions 58a is released by the advancing operation of the housing 50 from the state of FIG. 7A, the housing 50 starts to move to the front side of the connector relative to the engaging member 40.

In the optical connector 10, when the protruding claws 49 enters the engaging recesses 115 of the receiving-side optical connector 110 and engages with to the locking portions 116 of the receiving-side optical connector 110 and the tip portions of the elastic pieces 42 are spaced apart from the housing 50, the elastic biasing force of the biasing member 30 no longer acts on the housing 50.

The fitting state between the housing locking projections 48 and the front locking hole portions 58a of the long holes 58 of the housing 50 can be released by the force of a manual operation to advancing the housing 50 from the state shown in FIG. 7A. The housing locking projections 48 of the engaging member 40 slip out to the rear side from the front locking hole portions 58a of the long holes 58 of the housing 50 and enters the passage portions 58c of the long holes 58, with the advancing movement of the housing 50 from the state shown in FIG. 7A. The advancing operation (advancing movement) of the housing 50 with respect to the engaging member 40 is allowed until the housing locking projections 48 fits into the rear locking hole portions 58b (refer to FIG. 7B).

The advancing operation of the housing 50 is ended when the housing 50 has arrived at the tip constraint position with respect to the engaging member 40, as shown in FIG. 7B.

The housing 50 arranged at the tip constraint position is externally fitted to the receiving-side optical connector 110, and stores the tip portions of the pair of elastic pieces 42 therein. In the housing 50, the stopper protrusions 56 and front abutting wall portions 53a of the housing 50 abut the pair of elastic pieces 42 of the engaging member 40 from the external surface sides thereof, and an increase in the distance between the pair of tips of the elastic pieces 42 is regulated by the housing 50. As a result, a state where the protruding claws 49 has entered the engaging recesses 115 of the receiving-side optical connector 110 and has engaged with the locking portions 116 is stably maintained by the pair of elastic pieces 42.

Thereby, the optical connector 10 is fastened (connected) to the receiving-side optical connector 110.

The fitting state between the rear locking hole portions 58b of the long holes 58 and the housing locking projections 48 of the engaging member 40 can be manually released as an operator performs an operation to pull the housing 50 at the tip constraint position with fingers to the rear side of the connector (the right in FIG. 7B). The state where the housing 50 is locked to the engaging member 40 at the tip constraint position can be stably maintained unless the fitting between the rear locking hole portions 58b of the long holes 58 and the housing locking projections 48 of the engaging member 40 are released compulsorily by the movement operation from the tip constraint position to the rear side.

The housing locking projections 48 of the engaging member 40 function as housing locking portions which disengageably engage the housing 50 at the tip constraint position where the tips of the pair of elastic pieces 42 are stored, thereby regulating the retreat of the housing 50 with respect to the engaging member 40.

When fastening of the optical connector 10 to the receiving-side optical connector 110 is completed, the elastic biasing force of the biasing member 30 acts as the butting force between the ferrule 20 of the optical connector 10 and the receiving-side optical connector 110. As a result, each bare optical fiber 1a of the optical fiber 1 fixed to the ferrule 20 is optically connected to each optical fiber 113 fixed to the receiving-side optical connector 110 with low loss. Additionally, each bare optical fiber 1a of the optical fiber 1 is optically connected to the optical element 131 of the photoelectric conversion unit 130 via the optical fiber 113 of the receiving-side optical connector 110.

In a case where the optical element 131 is a light emitting element, the output light from the light emitting element can enter the bare optical fiber 1a of the optical fiber 1 via the optical fiber 113 of the receiving-side optical connector 110. In a case where the optical element 131 is a light receiving element, the transmission light of the bare optical fiber 1a of the optical fiber 1 can be received by the light receiving element via the optical fiber 113 of the receiving-side optical connector 110.

The optical connector 10 illustrated in FIG. 5 is adapted such that the biasing member receiving portion 41 of the rear end of the engaging member 40 is stored inside the guide piece portion 55 on the rear side of the housing 50 and the engaging member 40 does not protrude to the rear side from the rear end of the housing 50. Here, as shown in FIG. 7B, when the fastening of the optical connector 10 to the receiving-side optical connector 110 is completed, the engaging member 40 protrudes to the rear side from the rear end of the housing 50. For this reason, in the operation of fastening the optical connector 10 to the receiving-side optical connector 110, whether the fastening operation has been performed normally can be grasped by observing whether the engaging member 40 protrudes from the rear end of the housing 50.

The operation of extracting the optical connector 10 in the state of being fastened to the receiving-side optical connector 110 from the receiving-side optical connector 110 can be performed simply as an operator performs an operation to pull the housing 50 at the tip constraint position with his/her fingers to the rear side of the connector (the right in FIG. 7B).

The extracting operation is realized by performing an operation to pull the housing 50 at the tip constraint position to the rear side of the connector in the optical connector 10 in the state of being fastened to the receiving-side optical connector 110, and thereby undergoing the state of FIG. 7A, the state of FIG. 6B, and the state of FIG. 6A sequentially. The optical connector 10 is brought into the state (initial state) of FIGS. 1A, 3, 5, and 8A when the extraction of the optical connector from the receiving-side optical connector 110 is completed.

In the extracting operation, the optical connector 10 in the state of being fastened to the receiving-side optical connector 110 is arranged at the standby position 40 with respect to the engaging member 40 as the housing 50 is first moved from the tip constraint position by the operation of pulling the housing 50 to the rear side of the connector (refer to FIG. 7A).

The housing locking projections 48 of the engaging member 40 slip out from the rear locking hole portions 58b of the long holes 58 and fit into front locking hole portions 58a of the long holes 58, with the movement (retreat) of the housing 50 with respect to the engaging member 40. Additionally, the stopper protrusions 56 of the housing 50 abut the stepped faces 44a of the rear ends of the recesses 44 of the elastic pieces 42 from the front side when the housing 50 is arranged at the standby position.

Then, the housing 50 will apply the force in the direction of being spaced apart from the receiving-side optical connector 110 to the engaging member 40 by the continuation of the pulling operation of the optical connector 10.

As shown in FIG. 7A, the portions on the rear side of the apexes 49a of the protruding claws 49 of the tip portions of the pair of elastic pieces 42 of the engaging member 40 are used as tapered portions 49b for disengagement formed in the shape of a taper of which the protruding dimension from the elastic pieces 42 decreases as they go to the rear side from the apexes 49a.

In the optical connector 10, by performing an operation to pull the housing 50 to the rear side of the connector in the state shown in FIG. 7A, the protruding claws 49 are extracted from the engaging recesses 115 by the sliding between the tapered portions 49b for disengagement and the rear ends of the locking portions 116 (ends on the side of the engaging recesses 115) of the receiving-side optical connector 110 and ride on the locking portions 116 (refer to FIG. 6B). Additionally, in the optical connector 10, the engaging member 40 and the housing 50 are displaced (moved) to the rear side of the connector with respect to the ferrule 20 due to the elastic biasing force of the biasing member 30 as the protruding claws 49 slip out from the engaging recesses 115.

The optical connector 10 can be extracted from the receiving-side optical connector 110 through the state shown in FIG. 6A by the continuation of the pulling operation of the housing 50 after the protruding claws 49 have slipped out from the engaging recesses 115 in FIG. 6B.

The optical connector 10 can be simply fastened and connected to the receiving-side optical connector 110 by the push-on method, only by advancing the housing 50 toward the rear end side from the tip side of the receiving-side optical connector 110 without using an adapter. The optical connector 10 is inserted into and connected to the receiving-side optical connector 110 by externally fitting the housing 50 to the receiving-side optical connector 110.

The connection of the optical connector 10 to the receiving-side optical connector 110 corresponds to plug to plug connection. The optical connector 10 is a plug which can be fastened and connected to the receiving-side optical connector 110. The optical connector 10 can improve insertion into the receiving-side optical connector (plug) 110 and the workability of connection by fastening, in a plug-plug connection technique.

Additionally, the optical connector 10 can be extracted from the state of being fastened to the receiving-side optical connector 110, and can be simply attached to and detached from the receiving-side optical connector 110 by the push-on method.

For this reason, the attachment and detachment of the optical fiber 1A with a connector, having a configuration in which the optical connector 10 is assembled at the tip of the optical fiber 1, to the receiving-side optical connector 110, and the connection and disconnection between the optical fiber 1 and the optical fibers 113 on the side of the receiving-side optical connector 110 can thereby be performed simply.

The optical connector 10 can easily realize reduction (slimming) of the thickness dimension compared to the MPO-type optical connector. For this reason, as illustrated in FIGS. 4 and 9, the height H (refer to FIG. 9) from the circuit board 120 of a connector coupling body in which the optical connector 10 is fastened to the receiving-side optical connector 110 provided on the circuit board 120 can be made smaller easily compared to, for example, a case where an adapter for connection of the MPO-type optical connector is provided directly on the circuit board 120.

Accordingly, in the connector connection system illustrated in FIGS. 3, 4, and 9, it is easy to narrow the array pitch of the board 120A with a connector in a case where a plurality of boards 120A with a connector is installed so as to be arrayed in parallel. Additionally, if this connector connection system is provided, the installation space within a housing can be saved in a case where a plurality of boards 120A with a connector are mounted so as to be arrayed in parallel in a housing of an electric apparatus, such as a computer or a computer system.

Figure 10A:
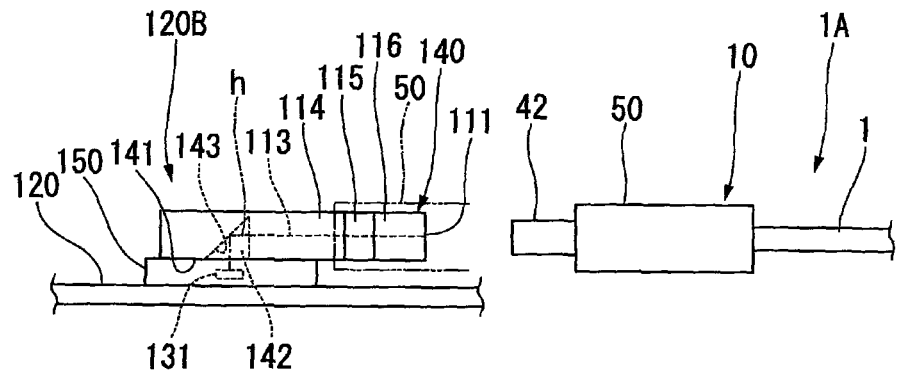
FIG. 10A is a front sectional view illustrating another aspect (another aspect of a plate member with a connector) of the connector connection system.
Figure 10B:
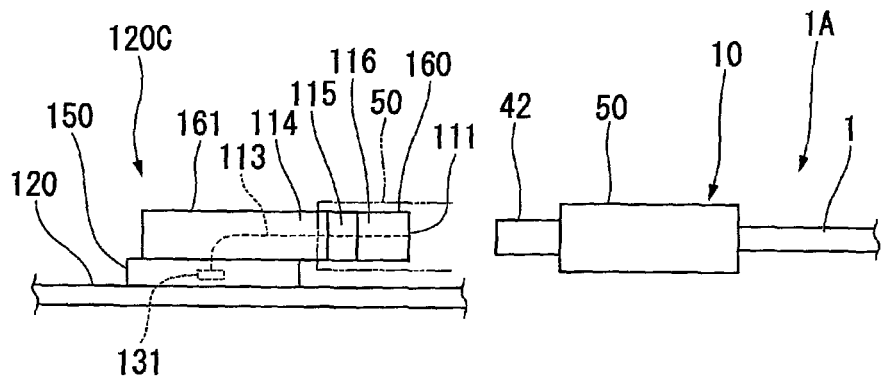
FIG. 10B is a front sectional view illustrating another aspect (another aspect of a plate member with a connector) of the connector connection system.

FIG. 10A and FIG. 10B show another aspect of a board with a connector and a connector connection system.

In addition, all tip faces 111 for butting and joining of receiving-side optical connectors 140 and 160 of boards 120B and 120C with a connector shown in FIGS. 10A and 10B extend in a direction substantially orthogonal to (perpendicular to or slightly inclining with respect to a virtual plane perpendicular to the circuit board 120) the circuit board 120.

The optical fibers 113 exposed to the tip face 111 of the receiving-side optical connector and the bare optical fibers 1a exposed to the tip face 21 of the ferrule 20 of the optical connector 10 are optically connected to each other using an optical axis in the direction along the circuit board 120 by butting portions which are butted against each other.

The board 120B with a connector shown in FIG. 10A is adapted such that the receiving-side optical connector 140 is attached to the side of the photoelectric conversion unit 150, which is mounted on the circuit board 120, opposite to the circuit board 120 so as to overhang above the circuit board 120 from the photoelectric conversion unit 150.

The receiving-side optical connector 140 is adapted such that a recess 142 depressed from a bottom face 141 which faces the photoelectric conversion unit 150 is formed at a rear end portion of the receiving-side optical connector 110 illustrated in FIG. 9, and a mirror portion 143 is provided at the inner surface of the recess 142. The mirror portion 143 is, for example, a metal thin film, and is provided at the inner surface of the recess 142 which inclines with respect to the bottom face 141. Additionally, the receiving-side optical connector 140 is arranged such that the rear ends of the optical fibers 113 face the mirror portion 143 via the recess 142. The optical axis of the rear ends of the optical fibers 113 follows a direction along the bottom face 141 of the receiving-side optical connector 140. The mirror portion 143 functions as a connecting optical path forming portion which forms a curved optical path h which optically couples the rear ends of the optical fibers 113 with the optical elements 131 within the photoelectric conversion unit 150.

The portion of the receiving-side optical connector 140 on the tip side (tip face 111 side) of the recess 142 has the same configuration as the receiving-side optical connector 110 illustrated in FIG. 9.

In the connector connection system shown in FIG. 10A, the optical fiber 1 can be optically connected to the optical elements 131 of the photoelectric conversion unit 150 via the optical fibers 113 and the optical path h of the receiving-side optical connector 140 by fastening the optical connector 10 of the tip of the optical fiber 1A with a connector to the receiving-side optical connector 140 of the board 120B with a connector.

Additionally, the board 120C with a connector shown in FIG. 10B is a board using a receiving-side optical connector designated by reference sign 160 instead of the receiving-side optical connector 140 of FIG. 10A. The receiving-side optical connector 160 is attached to the side of the photoelectric conversion unit 150, which is mounted on the circuit board 120, opposite to the circuit board 120. The receiving-side optical connector 160 is adapted such that a curved fiber storage portion 161 which stores the curved portions obtained by curving the optical fibers 113 is provided instead of the recess 142 and the mirror portion 143 in the receiving-side optical connector 140 of FIG. 10A. The portion of the receiving-side optical connector 160 on the tip side (tip face 111 side) of the curved fiber storage portion 161 has the same configuration as the receiving-side optical connector 110 illustrated in FIG. 9.

Additionally, the curved fiber storage portion 161 is fixed to the photoelectric conversion unit 150, and the portion of the receiving-side optical connector 160 on the tip side (tip face 111 side) of the curved fiber storage portion 161 is made to protrude so as to overhang above the circuit board 120 from the photoelectric conversion unit 150.

The optical fibers 113 of the receiving-side optical connector 160 are arranged such that the portions (rear end portions) thereof made to extend from the curved fiber storage portion 161 are drawn into the photoelectric conversion unit 150, and the end faces thereof are capable of being optically coupled to the optical elements 131 within the photoelectric conversion unit 150.

In the connector connection system shown in FIG. 10B, the optical fiber 1 can be optically connected to the optical elements 131 of the photoelectric conversion unit 150 via the optical fibers 113 of the receiving-side optical connector 160 by fastening the optical connector 10 of the tip of the optical fiber 1A with a connector to the receiving-side optical connector 160 of the board 120C with a connector. The optical fibers 113 of the receiving-side optical connector 160 function as a connecting optical path forming portion which optically couples the optical elements 131 of the photoelectric conversion unit 150 with the optical fiber 1 of the optical fiber 1A with a connector and which form optical paths having curved portions.

Even in the connector connection system of FIG. 10A and FIG. 10B, it is possible to easily realize suppression of the height of a connector coupling body, in which the optical connector 10 of the tip of the optical fiber 1 is fastened to a receiving-side optical connector of a board with a connector, from the circuit board 120, so that the height is smaller (lower) compared to the connection of an MPO-type optical connector using an adapter.

In addition, the present invention is not limited to the above-described embodiment, and suitable design changes can be made without departing from the spirit and scope of the present invention.

In the connector connection system of the above-described embodiment, the configuration in which the pair of guide pins 23 for positioning the ferrule 20 of the optical connector 10 and a receiving-side optical connector is provided on the optical connector 10 side. In this regard, as the connector connection system, there may be adopted a configuration in which a pair of guide pins which is provided at the receiving-side optical connector and is made to protrude from the tip face of the optical connector is inserted and fitted into the guide pin holes 22 of the ferrule 20 butting-connected to the receiving-side optical connector.

The multi-core ferrule is not limited to the ferrule attached to the tip of one optical fiber ribbon as illustrated in FIGS. 1A and 1B. As the ferrule, for example, as in a ferrule 20A shown in FIG. 11, there may be adopted a configuration in which the tips of a plurality of (two in the illustrated example) optical fiber ribbons 1T are attached as the optical fiber 1, and the tips of the bare optical fibers 1a of each optical fiber ribbon 1T are two-dimensionally arrayed at the tip face 21. The ferrule 20A illustrated in FIG. 11 has two rows in which the tips of the bare optical fibers 1a of each optical fiber ribbon 1T are arrayed in one row at the tip face 21 of the ferrule.

Additionally, as the ferrule, a configuration in which the tips of single core or multi-core optical fibers are attached can also be employed.

Figure 11:
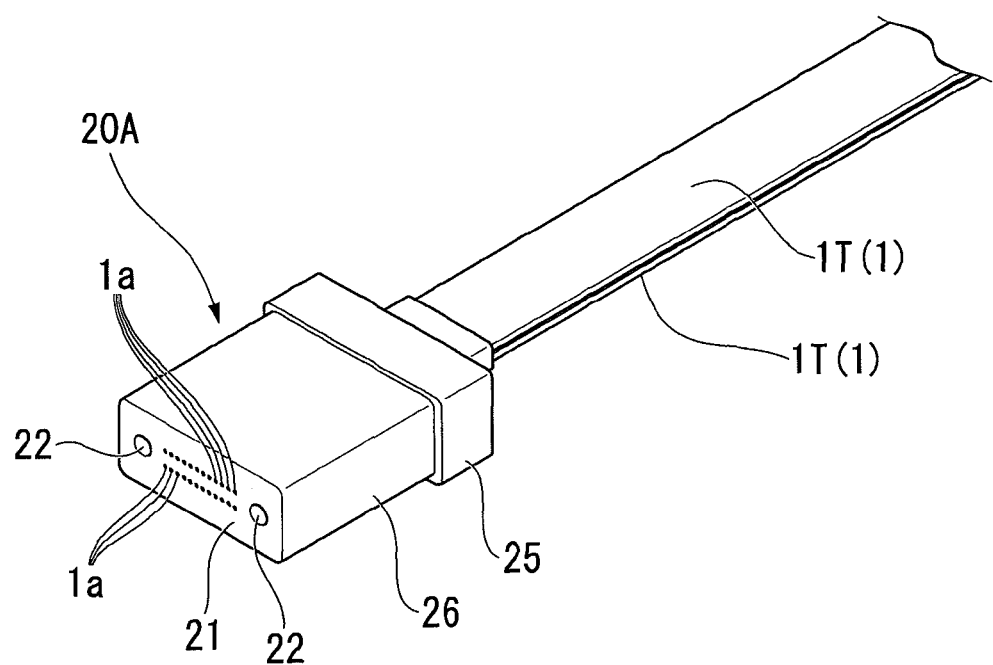
FIG. 11 is a perspective view illustrating another aspect of a multi-core ferrule which can be used for the optical connector.

Additionally, although the ferrule 20 illustrated in FIG. 11 is different from the ferrule 20 of the optical connector 10 in the number of the tips of the bare optical fibers 1a arrayed at the tip face 21 illustrated in FIGS. 2, 3, 5, and the like, this ferrule is the same as the ferrule 20 in that the ferrule has the pair of guide pin holes 22 and has the plate-shaped portion 26 and the flange portion 25 at the rear end of the plate-shaped portion.

The ferrule is not necessarily limited to a ferrule of a pin fitting and positioning type which has guide pin holes for allowing positioning guide pins to be inserted and fitted thereinto, and a ferrule which does not have the guide pin holes 22 can be adopted.

As shown in FIG. 8A and the like, the stepped face 51a and the rear end face 52a of the second face plate portion 52 in the housing 50 of the optical connector 10 function as ferrule engaging portions which are engageable with the flange portion 25 of the ferrule 20 from the front side. For this reason, in the optical connector 10, for example, the stepped faces 45a of the front ends of the flange portion storage recesses 45 of the engaging member 40 may be formed at the positions shifted nearer to the front side of the connector than the stepped face 51a and the rear end face 52a of the second face plate portion 52 in the housing 50 at the standby position. In the optical connector 10, even if the stepped faces 45a of the front ends of the flange portion storage recesses 45 of the engaging member 40 are shifted nearer to the front side of the connector than the stepped face 51a and the rear end face 52a of the second face plate portion 52 in the housing 50 at the standby position, the attachment and detachment (fastening and extraction from a fastened state) of the optical connector to/from the receiving-side optical connector can be performed.

The configuration of the optical connector 10 is not limited to a configuration which adopts the engaging member having the housing locking portion which disengageably engages with the housing. For example, a configuration in which the housing is immobilized at the tip constraint position by the contact resistance (slip resistance) between the engaging member and the housing can also be adopted. Here, the contact resistance is set to such a magnitude that the housing at the tip constraint position is manually operated to be pulled and moved to the rear side.

Additionally, as for the optical connector 10, the configuration (standby position holding structure) in which the movement resistance of the engaging member to the rear side with respect to the housing at the standby position is not limited to the engaging member locking portion which disengageably engages with the engaging member. As the standby position holding structure, when the optical connector 10 is fastened to the receiving-side optical connector 110, a configuration may be adopted in which the movement of the engaging member to the rear side with respect to the housing can be regulated until the tip portions of the elastic pieces 42 are curvedly deformed and abut the front end portion of the housing 50 by the pressing to the receiving-side optical connector 110. As the standby position holding structure, a configuration may also be adopted in which the movement of the engaging member to the rear side with respect to the housing until the tip portions of the elastic pieces 42 abut the front end portion of the housing 50 due to the curved deformation is regulated by the contact resistance between the engaging member and the housing (slip resistance). Here, the movement resistance of the engaging member to the rear side with respect to the housing, which is generated by the standby position holding structure is set to such a magnitude that the movement of the housing to the front with respect to the engaging member can be manually performed when the protruding claws 49 of the tips of the elastic pieces 42 have engaged with the locking portions 116 on both sides of the receiving-side optical connector 110.

When the optical connector 10 is fastened to the receiving-side optical connector 110, the engaging member 40 can also be pressed toward the receiving-side optical connector 110 along with the housing, thereby performing fastening operation.

The optical connector 10 is not necessarily adapted such that the tip portions of the elastic pieces 42 curved by the riding of the protruding claws 49 onto the locking portions 116 on both side of the receiving-side optical connector 110 are pressed by the front end portion of the housing 5 from the rear side, thereby making the protruding claws 49 engage with of the locking portions 116 of the receiving-side optical connector 110.

As the plate member with a connector, for example, a structure (board with a connector) in which an MT ferrule attached to the tips of optical fibers is mounted on the circuit board 120, a structure in which an MT ferrule attached to the tips of optical fibers is mounted on a plate member in which circuit wiring is not formed, and the like can be adopted.

Next, an optical connector connecting jig which can be preferably used for the operation of connecting the above-described optical connector to the receiving-side optical connector, and an optical connector connecting method using the optical connector connecting jig will be described below.

In addition, an optical connector 280 which will be described later uses an optical connector of the same configuration (the same optical connector 280 of the illustrated example has the same configuration as the optical connector 10 of FIG. 1A) as the optical connector 10 as described earlier.

Figure 12:
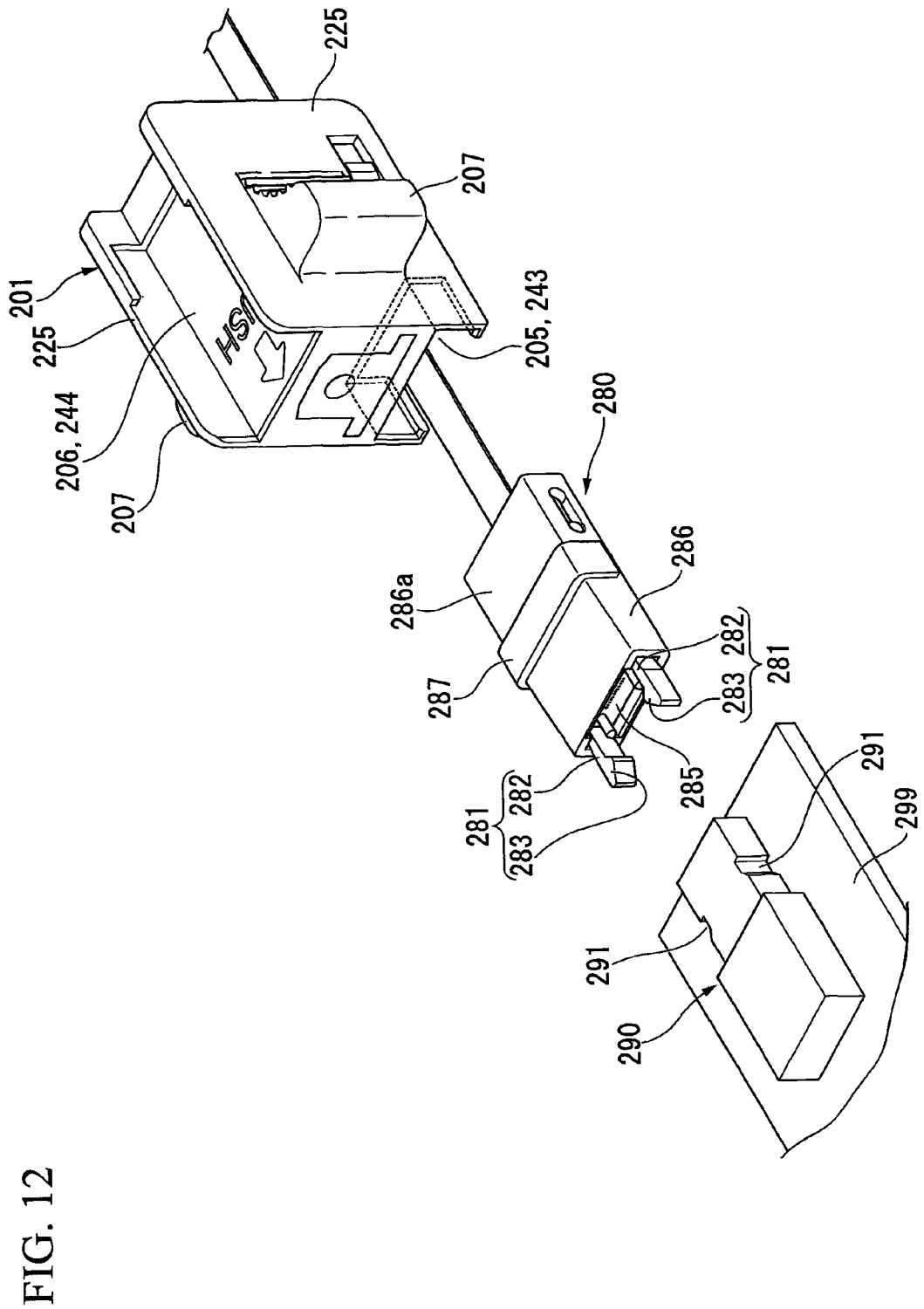
FIG. 12 is a perspective view showing a state where an optical connector connecting jig is used.

FIG. 12 is a perspective view showing a state where an optical connector connecting jig is used. An optical connector connecting jig 201 shown in FIG. 12 is a jig which accommodates the optical connector 280 in a first accommodating portion 205 (a first space 243) to mount the optical connector 280, and thereby connects the optical connector 280 to a receiving-side connector 290 mounted on a circuit board 299 without using an adapter.

Additionally, the optical connector connecting jig 201 has the function as a jig which accommodates the optical connector 280 in a second accommodating portion 206 (a second space 244) to remove the optical connector.

Here, the optical connector 280 includes an engaging member 281 which has a pair of elastic pieces 282 which engage with of locking portions 291 of the receiving-side connector (optical connector) 290 at the sides thereof, a ferrule 285 (refer to FIG. 21) which is biased forward in a connecting direction with respect to the engaging member 281 via a spring 284, and a tubular housing 286 which covers the outside of the engaging member 281 so as to be movable back and forth, and regulates outward opening of the protruding claws 283 of the tips of elastic pieces 282 of the engaging member 281, thereby constraining the engaging posture of the engaging member 281.

The housing 286 is adapted to be movable in the front-rear direction relative to the engaging member 281. When the housing 286 is moved forward with respect to the engaging member 281, the elastic pieces 282 are substantially covered with the housing 286, and the engaging posture of the engaging member 281 is constrained. Additionally, when the housing 286 is moved rearward with respect to the engaging member 281, the front portions of the elastic pieces 282 are exposed, and the elastic pieces 282 become deformable. Additionally, in this state, the rear end portion of the housing 286 and the rear end portion of the engaging member 281 are on the same plane (refer to FIG. 21).

The optical connector 280 shown in FIG. 12 shows a state where the housing 286 retreats and the fronts of the elastic pieces 282 are exposed.

Next, the operation of the optical connector 280 will be described. When the optical connector 280 is made to abut the receiving-side connector 290, and further, the optical connector 280 is pressed toward the receiving-side connector 290 against the biasing force of the spring 284, the protruding claws 283 of the engaging member 281 engage with the locking portions 291 of the receiving-side connector 290. In this state, by moving the housing 286 forward in the connecting direction and making the housing 286 fit from the outer periphery of the engaging member 281, the pair of elastic pieces 282 and the protruding claws 283 are constrained, and deformation of the elastic pieces 282 become impossible. Thereby, the connection between the optical connector 280 and the receiving-side connector 290 is completed.

Since the optical connector 280 has the configuration as described above, the thickness dimension can be reduced (slimmed) as compared to the conventional MPO-type optical connector. In the conventional MPO-type optical connector, the thickness of the connector itself is large. Therefore, the spacing between circuit boards which are installed in parallel will increase. In contrast, the optical connector 280 can narrow the spacing between circuit boards, and can realize high density and miniaturization of a photoelectric composite board.

Figure 13:
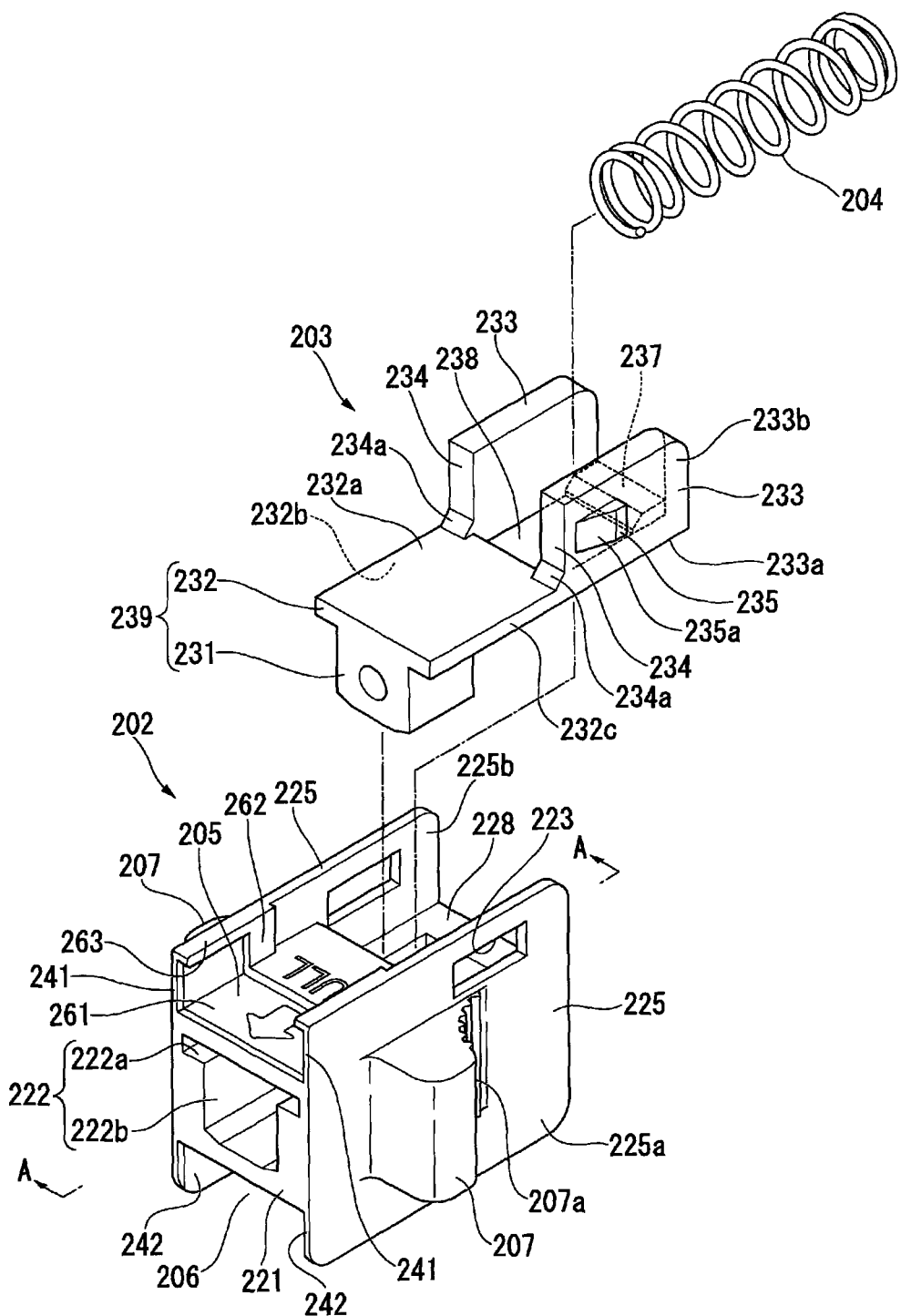
FIG. 13 is an exploded perspective view showing the optical connector connecting jig of FIG. 12.
Figure 14A:
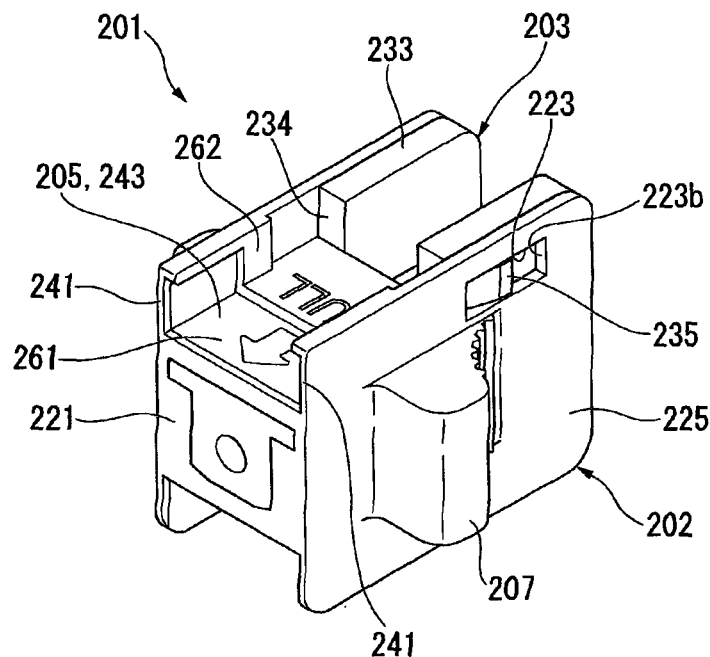
FIG. 14A is a perspective view showing the normal state of the optical connector connecting jig of FIG. 12.
Figure 14B:
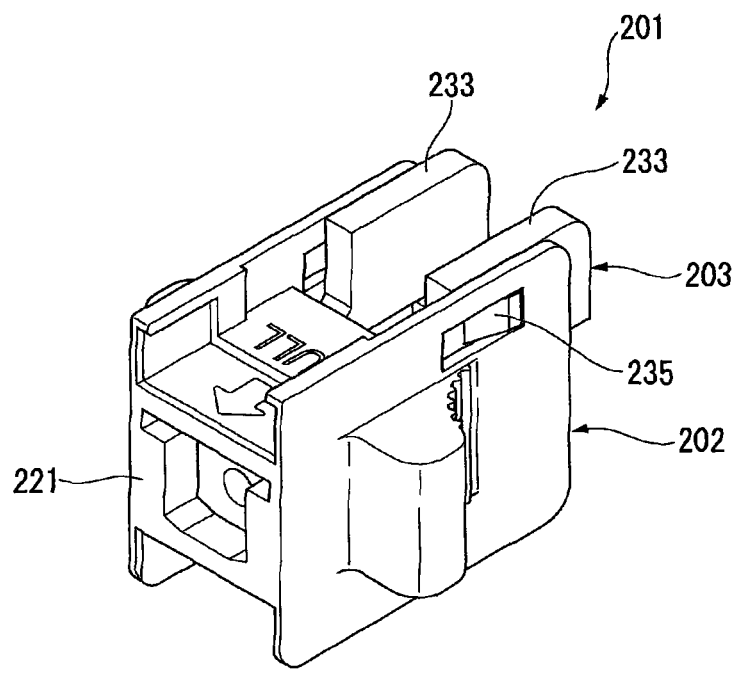
FIG. 14B is a perspective view showing the retreat state of the optical connector connecting jig of FIG. 12.
Figure 15A:
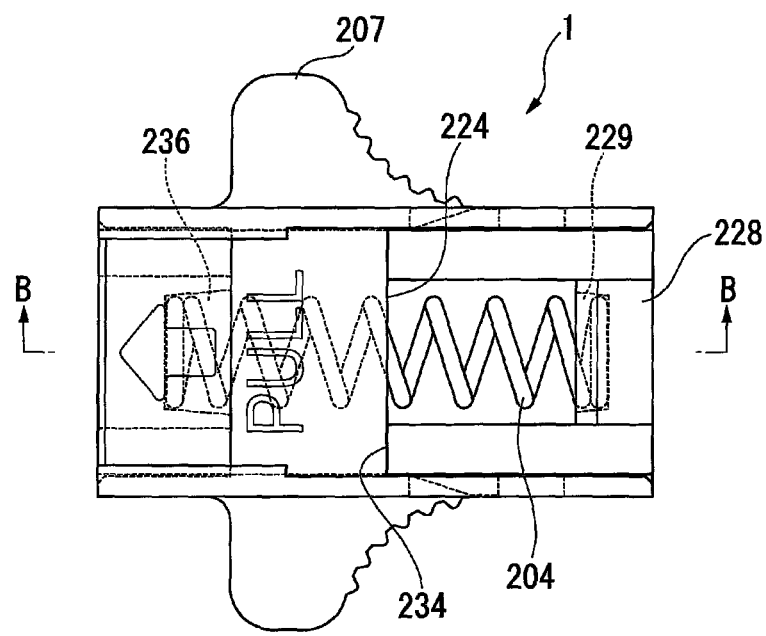
FIG. 15A is a plan view showing the normal state of the optical connector connecting jig of FIG. 12.
Figure 15B:
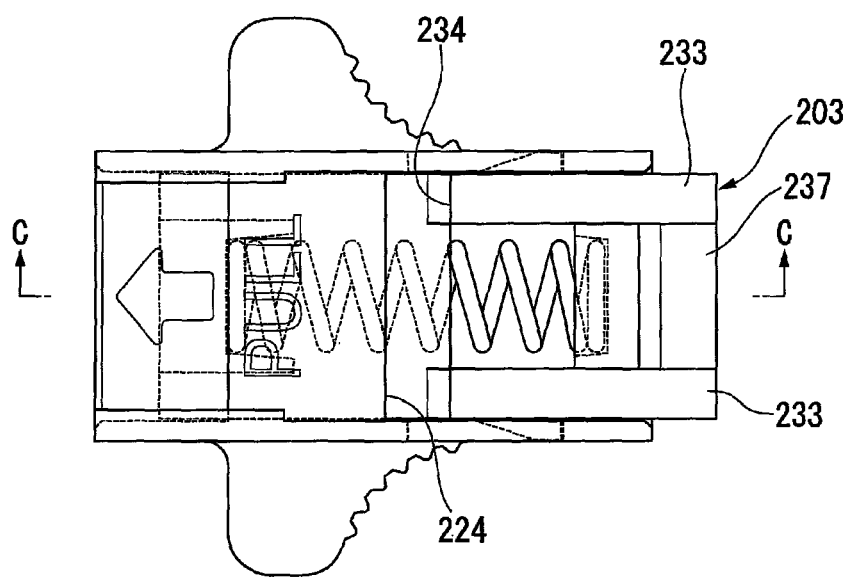
FIG. 15B is a plan view showing the retreat state of the optical connector connecting jig of FIG. 12.

Next, the optical connector connecting jig 201 will be described in detail. FIG. 13 is an exploded perspective view of the optical connector connecting jig of the present embodiment. FIGS. 14A and 14B are perspective views of the optical connector connecting jig 201, and FIG. 14A is a view showing a normal state, and FIG. 14B shows a state where a pressing member 203 retreats. FIG. 15A and FIG. 15B are plan views of the optical connector connecting jig 201.

As shown in FIGS. 13, 14A, and 14B, the optical connector connecting jig 201 includes a jig body 202, the pressing member 203, and a coil spring (biasing member) 204 which is interposed between the jig body 202 and the pressing member 203 to bias the pressing member 203 forward in the connecting direction of the optical connector 280.

In the following description (the brief description of the drawings is also the same), a state (that is, a state where the optical connector connecting jig 201 is assembled) where the pressing member 203 is combined with the jig body 202 along with the spring 204 is referred to as a combined state. Additionally, a state where the pressing member 203 is biased forward by the spring 204 is referred to as a normal state (refer to FIG. 14A), and a state where the pressing member 203 is pressed rearward, and thereby the pressing member 203 retreats relative to the jig body 202 is referred to as a retreat state (refer to FIG. 14B).

The optical connector connecting jig 201 is substantially in the shape of a rectangular parallelepiped, and the first accommodating portion 205 and the second accommodating portion 206 are provided in two facing surfaces, respectively. Additionally, a pair of right and left projection-shaped operating portions 207 is provided on external surfaces 225a and 225a of the side wall portions 225 and 225 which are two facing surfaces.

The optical connector connecting jig 201 includes a guide portion 221 which slidably receives a sliding portion 239 of the pressing member 203 between both the side wall portions 225 and 225. The optical connector connecting jig 201 is formed with the first space 243 which has a U-shaped section along the front-rear direction on the front side of an upper portion as the first side wall portions 241 and 241 from a first bottom portion 261 which is the upper surface of the guide portion 221 rise up and down, and is surrounded by the first bottom portion 261 and the first side wall portions 241 and 241. The first accommodating portion 205 is adapted to be capable of storing the optical connector 280 in the first space 243.

Additionally, the optical connector connecting jig 201 is formed with the second space 244 which has a U-shaped section along the front-rear direction on the rear side of a lower portion as the second side wall portions 242 and 242 from a second bottom portion 265 which is the lower surface of the guide portion 221 rise up and down, and is surrounded by the second bottom portion 265, and the second side wall portions 242 and 242. The second accommodating portion 206 is adapted to be capable of storing the optical connector 280 in the second space 244.

The first accommodating portion 205 is an accommodating portion which accommodates the optical connector 280 when the optical connector 280 is connected to the receiving-side connector 290. On the other hand, the second accommodating portion 206 is an accommodating portion which accommodates the optical connector 280 when the optical connector 280 is removed from the receiving-side connector 290. That is, the optical connector connecting jig 201 is adapted to allow connection and removal of the optical connector 270 by turning and using the connecting jig upside down.

Additionally, the first accommodating portion 205 and the second accommodating portion 206 are adapted such that the direction of the optical connector 280 accommodated in the first accommodating portion 205 and the direction of the optical connector 280 accommodated in the second accommodating portion 206 become opposite to each other.

The operating portions 207 are portions which rise in the shape of a circular arc smoothly from the side wall portions 225 and have a chevron-shaped cross-section, and presser portions 207a subjected to knurling are provided on the rear surface sides of the operating portions. The operating portions 207 are provided slightly ahead of the optical connector connecting jig 201, and thereby, the grip forces applied to the pair of right and left presser portions 207a are applied to the guide portion 221 substantially in the middle of the optical connector connecting jig 201 in the front-rear direction.

The pressing member 203 includes the front sliding portion 239, and a rear receiving portions 233, and is adapted to be movable in the front-rear direction with respect to the jig body 202 in the state of being assembled into the jig body 202. The sliding portion 239 includes a lower spring holding portion 231 and an upper base portion 232.

The base portion 232 is a rectangular plate-shaped member which is wider than the spring holding portion 231, and the spring holding portion 231 is a block-shaped member which protrudes downward from a lower surface 232b of the base portion 232 at a front portion of the base portion 232.

As shown also in FIGS. 16A and 16B, a first spring accommodating hole 236 for accommodating the spring 204 from the rear surface is formed in the spring holding portion 231, and holds the spring 204 in cooperation with a second spring accommodating hole 229 of the jig body 202 which will be described later.

A pair of receiving portions 233 is formed at both corners of the rear end of the base portion 232. The respective receiving portions 233 are rectangular plate-shaped members which are set to have the spacing which falls between the side wall portions 225 and 225 of the jig body 202 and are thicker than the side wall portions 225. The external surfaces 233b of the receiving portions 233 are connected to the side end faces 232c of the base portion 232, and are connected to the lower surface 232b of the base portion 232 and the lower end faces 233a of the receiving portion 233. Additionally, the front end faces of the receiving portions 233 are constituted as receiving surfaces 234, and are directed to the front. Moreover, chamfered portions 234a are formed at corners formed by the upper surface 232a of the base portion 232 and the receiving surfaces 234 of the receiving portions 233, and when the receiving surfaces 234 are pressed, concentration of stress onto the corners is avoided.

Additionally, the receiving portions 233 and 233 are formed with a reinforcing bar 237 which couples lower portions of rear ends of the receiving portions together, and the reinforcing bar prevents the receiving portions 233 from being deformed in a direction in which the receiving portions approach each other. A space portion formed by the rear end of the base portion 233, the reinforcing bar 237, and the respective receiving portions 233 is defined as a spring insertion hole 238 into which the spring 204 is inserted in a state where the pressing member 203 is combined with the jig body 202.

Figure 16A:
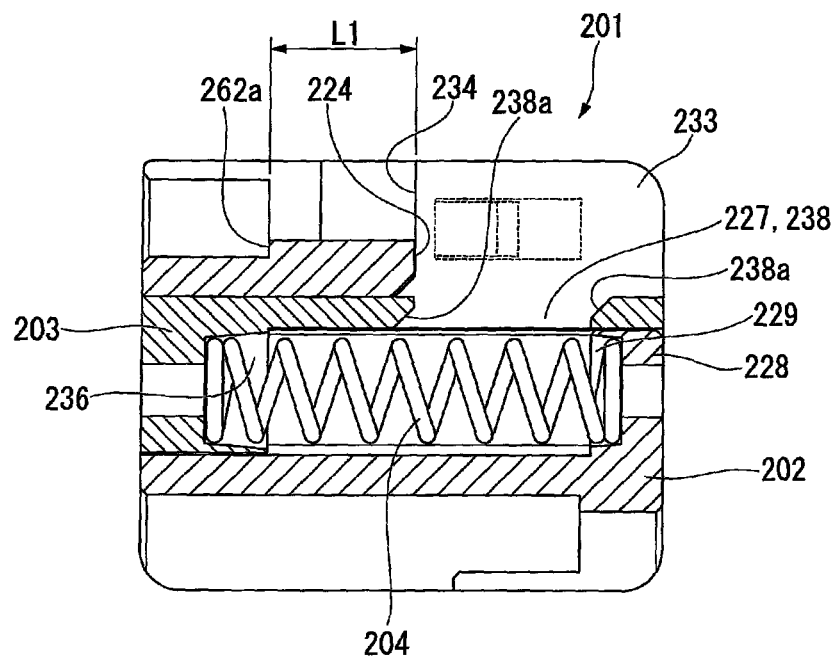
FIG. 16A is a sectional view showing the normal state of the optical connector connecting jig of FIG. 12.
Figure 16B:
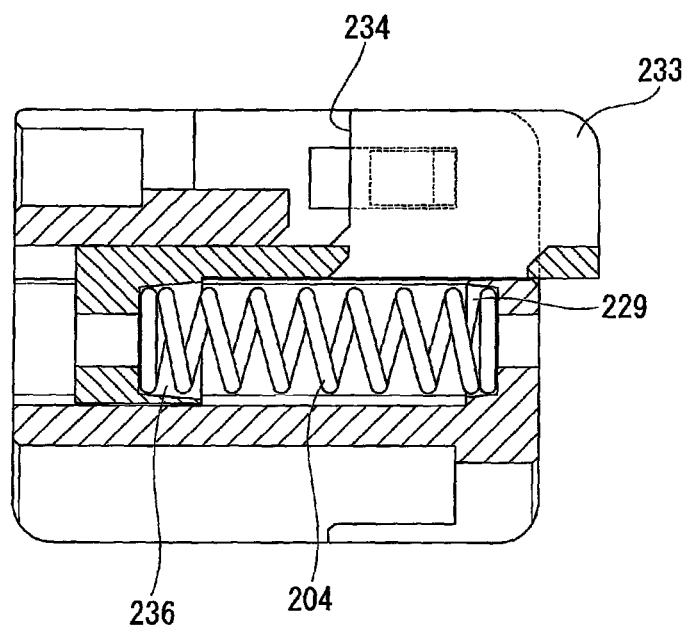
FIG. 16B is a sectional view showing the retreat state of the optical connector connecting jig of FIG. 12.

In addition, the rear end of the base portion 233 and the reinforcing bar 237 are formed with inclined surfaces 238a which guides insertion of the spring 204 (refer to FIGS. 16A and 16B).

The external surface 233b of each receiving portion 233 are provided with a limiting projection 235. The limiting projections 235 are portions which protrude in the width direction of the optical connector connecting jig 201 from the external surfaces 233b of the receiving portions 233, and engage with limiting holes 223 of the jig body 202 which will be described later. Each limiting projection 235 is formed with an inclined surface 235a in which the protruding height of the limiting projection 235 becomes gradually larger toward the rear from the external surface 233b.

Next, the jig body 202 will be described below. As shown in FIG. 13, the first accommodating portion 205 of the jig body 202 is formed by the first bottom portion 261 which is the upper surface of the guide portion 221 and the first side wall portions 241 in order to receive and hold the optical connector 280 in each housing 286.

Additionally, the first side wall portions 241 are formed with first regulating portions 262 to which a convex portion 287 (refer to FIG. 12) formed on the housing 286 of the optical connector 280 is locked. When the optical connector 280 is accommodated, a convex portion 287 of the optical connector 280 is prevented from moving rearward beyond the first regulating portions 262. A rear portion 286a of the housing 286 of the optical connector 280 can be accommodated in a space defined by the first regulating portions 262.

Moreover, the first accommodating portion 205 is provided with connector grip portions (grip portions) 263 which are provided such that the upper ends of the first side wall portions 241 protrude toward the inside of the jig body 202. The connector grip portions 263 prevent drop-out of the optical connector 280 in a direction (up-and-down direction) which intersects the front-rear direction (connecting direction).

Figure 17:
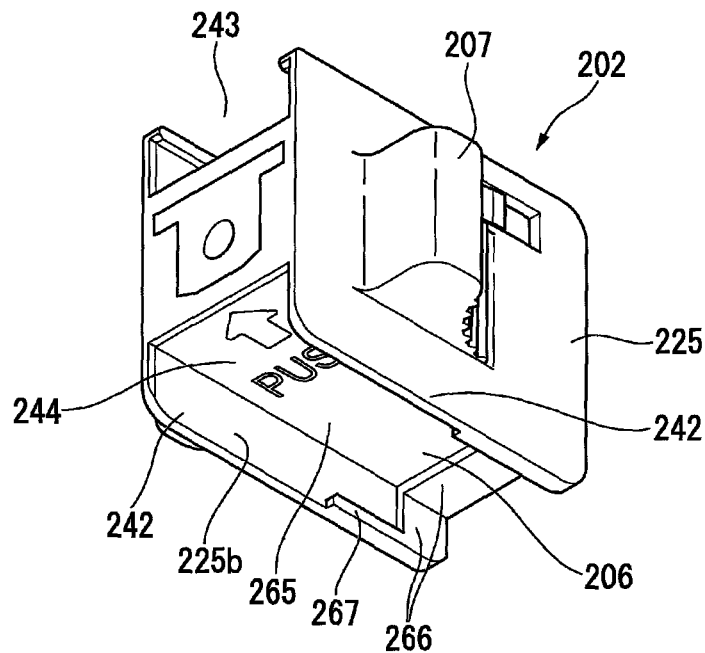
FIG. 17 is a perspective view of the optical connector connecting jig of FIG. 12 as seen from below.

As shown in FIG. 17, the second accommodating portion 206 is formed by the second bottom portion 265 which is the lower surface of the guide portion 221 and the second side wall portions 242 in order to receive and hold the optical connector 280 in each housing 286. Additionally, the second side wall portions 242 are formed with second regulating portions 266 to which the convex portion 287 formed on the housing 251 of the optical connector 280 is locked. Moreover, the second accommodating portion 206 is provided with connector grip portions (grip portions) 267 which are provided such that the upper ends of the second side wall portions 242 protrude toward the inside of the jig body 202.

As shown in FIG. 13, the guide portion 221 of the jig body 202 is formed with a guide hole 222 into which the sliding portion 239 of the pressing member 203 is inserted. The cross-sectional shape of the guide hole 222 is a shape corresponding to the cross-sectional shape of the sliding portion 239. Specifically, the cross-sectional shape of the guide hole 222 is formed substantially T-shaped from a horizontal portion 222a corresponding to the base portion 233 of the sliding portion 239 and a middle portion 222b corresponding to the spring holding portion 231.

The guide hole 222 does not penetrate in the front-rear direction (refer to FIG. 18), and has a spring holding wall 228 formed on the rear end side of the jig body 202 as a base end. The second spring accommodating hole 229 is formed at a position corresponding to the extension line of the guide hole 222 of the spring holding wall 228. The second spring accommodating hole 229 holds the spring 204 in cooperation with the above-described first spring accommodating hole 236.

Figure 18:
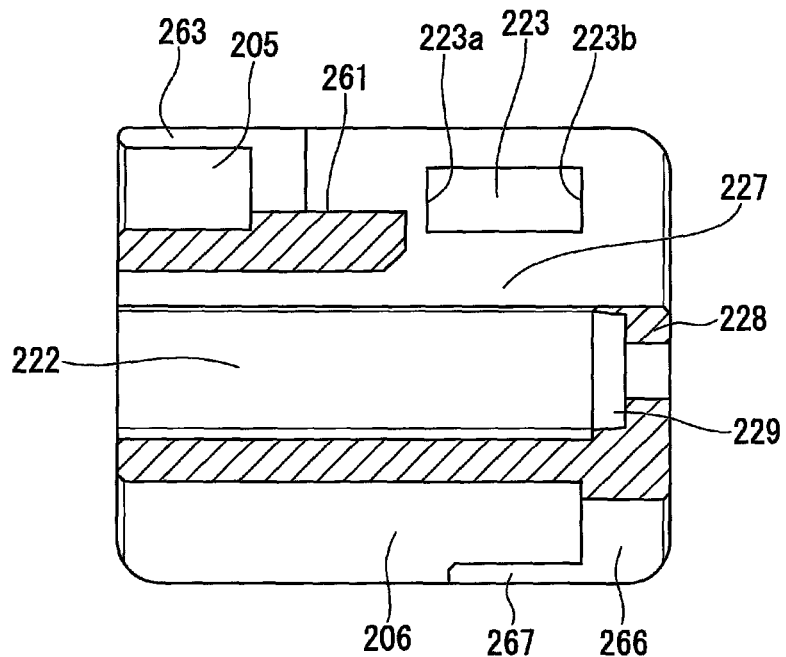
FIG. 18 is a sectional view of a jig body taken along the line A-A of FIG. 13.

Additionally, the jig body 202 is formed so that the pressing member 203 can be inserted into the jig body from the upper rear side. Specifically, as shown in FIG. 18, the rear end of the first bottom portion 261 of the first accommodating portion 205 extends to almost the middle portion in the front rear direction, and the rear side thereof is used as a pressing member insertion hole 227. Thus, access can be made to the guide hole 222 from the upper portion of the jig body 202. The combined state can be brought by making the pressing member 203 slide forward and by inserting the spring holding portion 231 into the above-described guide hole 222 after the spring holding portion 231 of the pressing member 203 is inserted into the insertion hole 227.

Additionally, the side wall portions 225 are formed with a thickness such that the side wall portions can be pushed wide and bent easily by the limiting projections 235 of the receiving portions 233 when the pressing member 203 is inserted. Moreover, the external surfaces 233b of the receiving portions 233 and the other surfaces 225b of the side wall portions 225 are adapted to abut each other in the combined state where the pressing member 203 is inserted.

The limiting holes 223 are provided in oblique upper rear portions of the above-described operating portions 7 in the side wall portions 225 of the jig body 202. In the combined state, the limiting projections 235 of the pressing member 3 are locked to the limiting holes 223.

When the optical connector connecting jig 201 is brought into a retreat state, the limiting holes 223 are formed such that the rear ends of the limiting projections 235 abut the rear ends 223b of the limiting holes 223.

Next, the movable range of the optical connector connecting jig 201 will be described. As described above, the optical connector connecting jig 201 can adopt a normal state as shown in FIG. 15A and the like and a retreat state as shown in FIG. 15B and the like. In the normal state, the pressing member 203 is biased forward by the biasing force of the spring 204. Specifically, the action by which the spring holding wall 228 of the jig body 202 and the spring holding portion 231 of the pressing member 203 are separated from each other is produced by the spring 204 arranged between the first spring accommodating hole 236 of the pressing member 203 and the second spring accommodating hole 229 of the jig body 202, and thereby, the receiving portions 233 is biased forward.

As shown in FIGS. 16A and 16B, the receiving surfaces 234 of the receiving portions 233 are adapted so as to abut pressing member abutting portions 224 in the normal state shown in FIG. 16A. Additionally, the receiving portions 233 are arranged behind the first accommodating portion (first space) 205. This determines the positional relationship between the abutting surfaces 262a of the first regulating portions 262 and the receiving surfaces 234. The distance L1 between the abutting surfaces 262a and the receiving surfaces 234 in the normal state is set so as to be approximately equal to the distance L2 (refer to FIG. 21) between the rear end of the convex portion of the optical connector 280 and the rear end of the housing 251.

Additionally, as shown best in FIG. 14B, in the retreat state, the rear ends of the limiting projections 235 are adapted so as to abut the rear ends 223b of the limiting holes 223. This limits the retreat range of the pressing member 203.

Next, the method of assembling the optical connector connecting jig 201 will be described. When the optical connector connecting jig 201 is assembled, the spring holding portion 231 of the pressing member 203 is first inserted into the pressing member insertion hole 227 of the jig body 202. Next, the spring holding portion 231 is inserted into the guide hole 222 by moving the pressing member 203 forward. At this time, although the limiting projections 235 interferes with the side wall portions 225 of the jig body 202, the side wall portions 225 are pushed wide by the inclined surfaces 235a of the limiting projections 235 when the pressing member 203 is moved forward. Thereby, the limiting projections 235 engage with the limiting holes 223 formed in the side wall portions 225.

Next, as shown in the sectional view of FIG. 16A, the spring 204 is inserted through the spring insertion hole 238 in the contracted state, the front end of the spring 204 is made to abut the first spring accommodating hole 236 of the pressing member 203, and the rear end of the spring is made to abut the second spring accommodating hole 229 of the jig body 202.

Next, the operation of the optical connector connecting jig 201 of the present embodiment will be described.

First, the method of connecting the optical connector 280 using the optical connector connecting jig 201 will be described.

Figure 19:
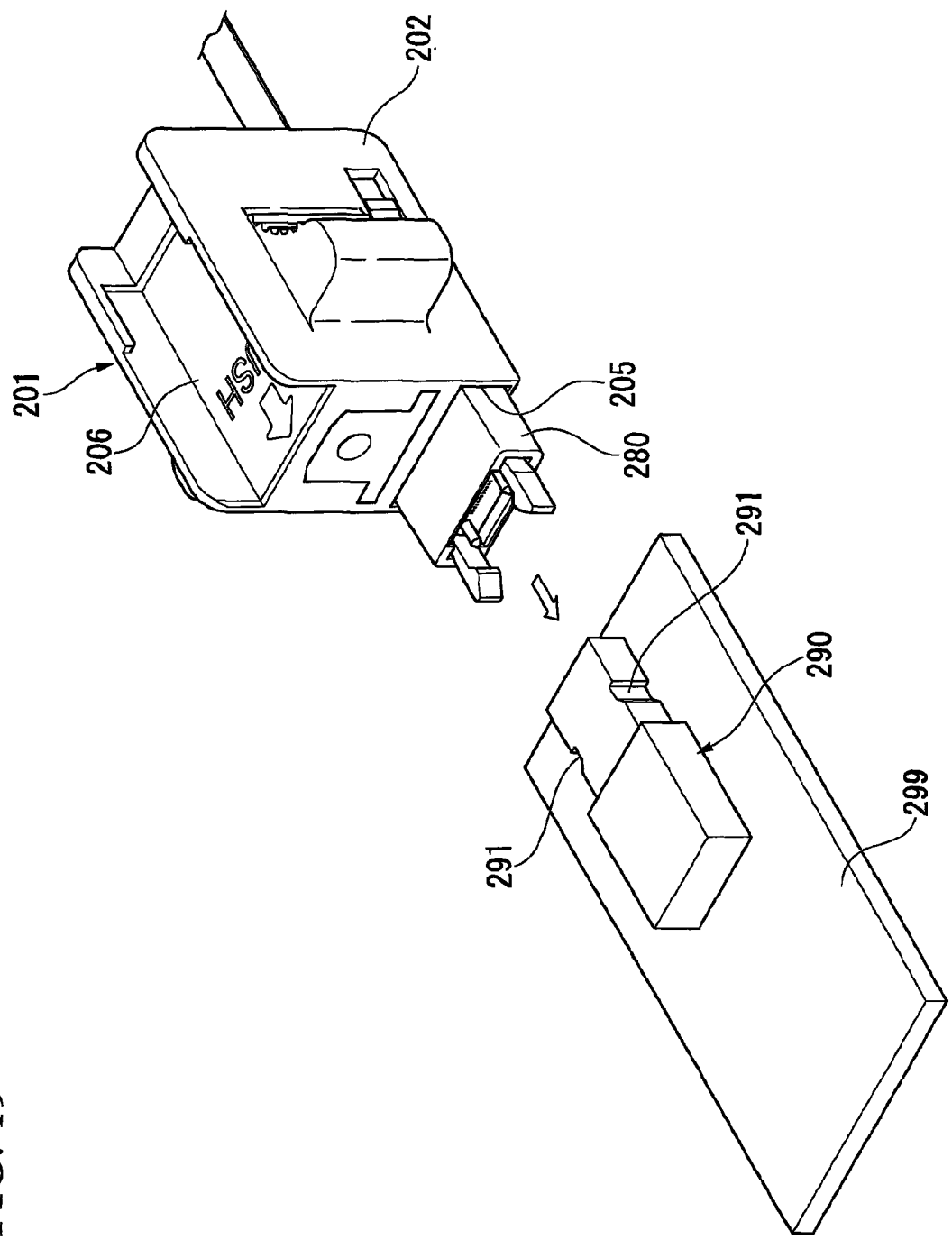
FIG. 19 is a perspective view showing that the optical connector is connected, using the optical connector connecting jig.
Figure 20:
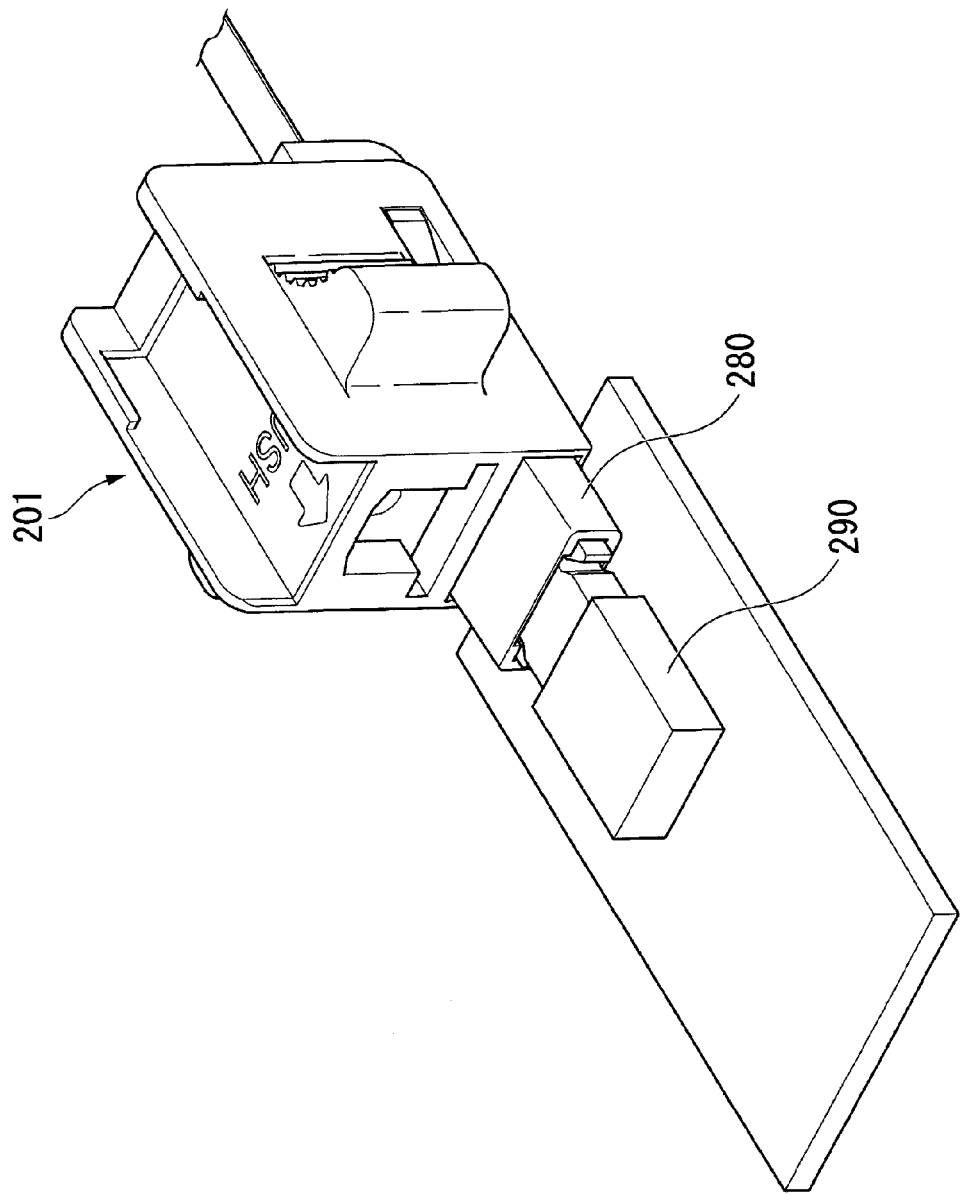
FIG. 20 is a perspective view showing that the optical connector is connected, using the optical connector connecting jig.

FIGS. 19 and 20 are perspective views showing that the optical connector 280 is connected, using the optical connector connecting jig 201. In these drawings, reference sign 290 designates a receiving-side connector to which the optical connector 280 is connected, and the receiving-side connector 290 is mounted on the board 299.

First, the optical connector connecting jig 201 is made to approach from the rear in the connecting direction of the optical connector 280, and as shown in FIG. 19, the optical connector 280 is accommodated in the first accommodating portion 205. At this time, the optical connector connecting jig 201 is adapted such that the first accommodating portion 205 is turned down and the second accommodating portion 206 is turned up. Further, as shown in FIG. 20, the optical connector 280 is connected to the receiving-side connector 290 by gripping the operating portions 207 and moving the optical connector connecting jig 201 forward in the connecting direction.

The connection process will be described in detail with reference to FIGS. 21 to 24.

(1) Approaching Step

Figure 21:
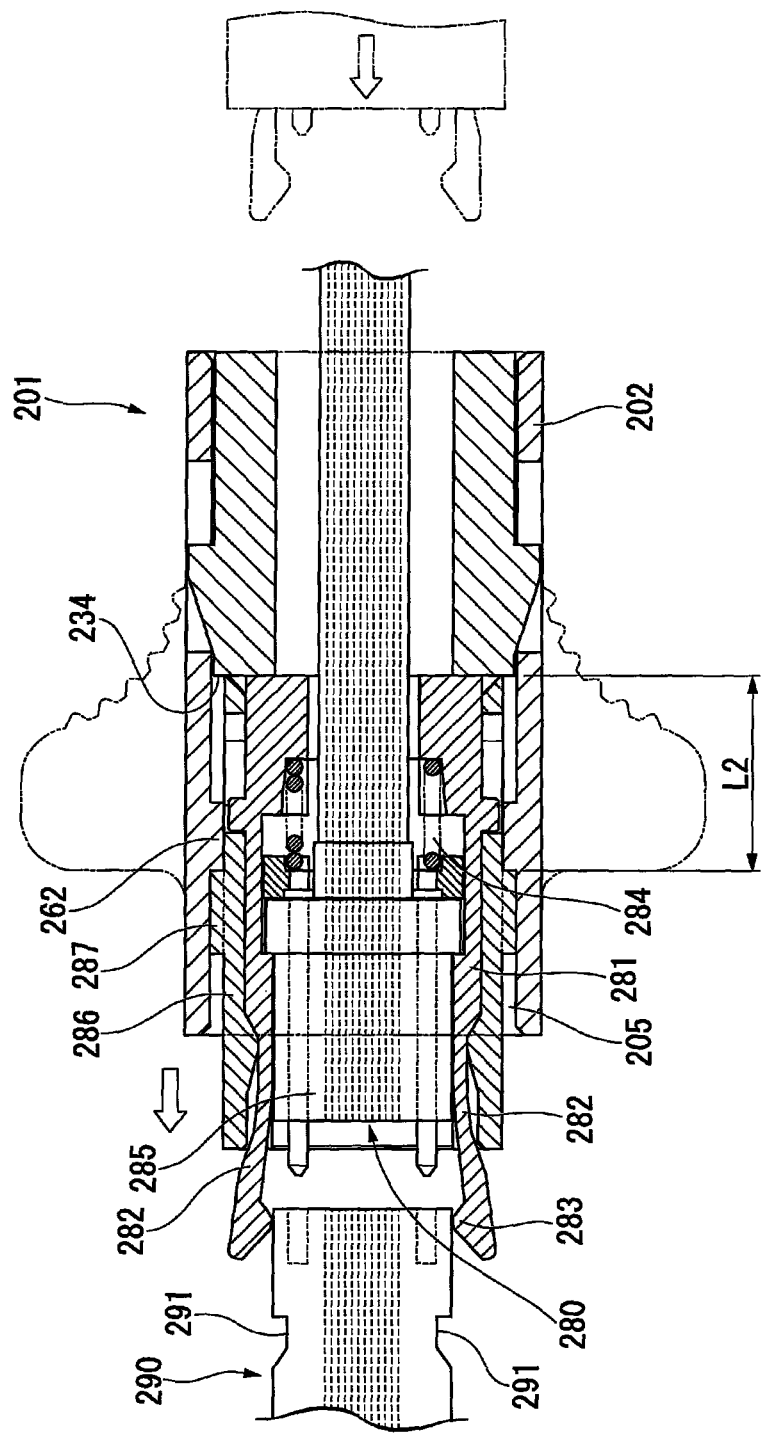
FIG. 21 is a view showing a connecting step using the optical connector connecting jig.

FIG. 21 shows that the optical connector connecting jig 201 has been approached and moved forward in the connecting direction in a state where the optical connector 280 is accommodated in the first accommodating portion 205. The pair of elastic pieces 282 of the optical connector 280 is elastically deformed outward, and the receiving-side connector 290 enters the space between the protruding claws 283. In this step, the ferrule 285 of the optical connector 280 is biased forward in the connecting direction.

In this step, the optical connector connecting jig 201 is brought into a normal state by the biasing force of the spring 204. That is, the pressing member 203 does not retreat with respect to the jig body 202. The convex portion 287 of the housing 286 engages with the first regulating portions 262 of the jig body 202. Further, in this state, the rear end of the housing 286 and the rear end of the engaging member 281 abut the receiving surfaces 234 of the pressing member 203 (the housing 286 retreats).

Since the pressing member 203 (receiving surfaces 234) does not retreating due to the biasing force of the spring 204, the optical connector 280 is pushed forward without forward movement of the housing 286 when the optical connector connecting jig 201 is moved forward in the connecting direction.

(2) Optical Connector Abutting Step

Figure 22:
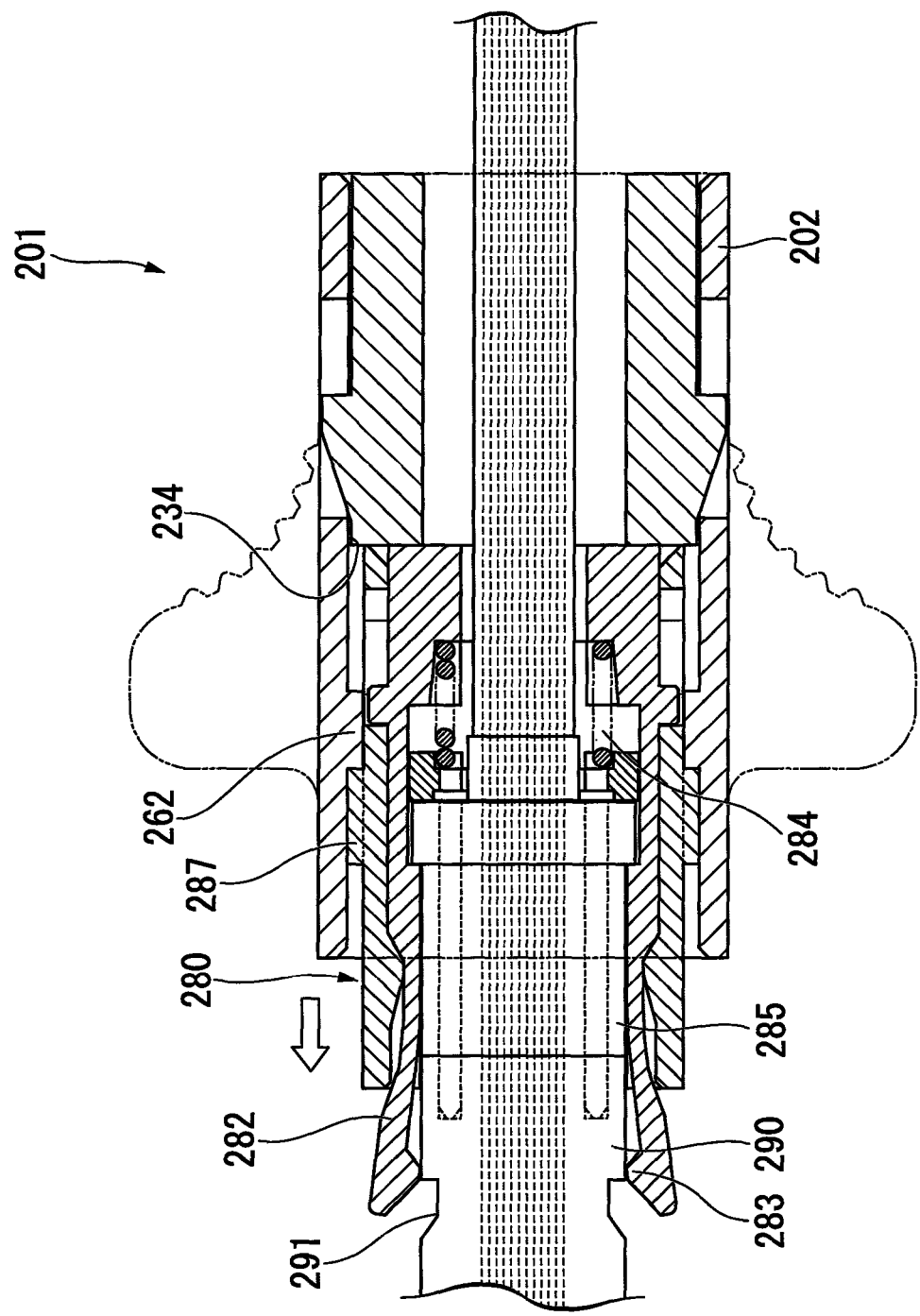
FIG. 22 is a view showing the connecting step using the optical connector connecting jig.

The optical connector 280 is further moved forward in the connecting direction from the state of FIG. 21, and as shown in FIG. 22, the ferrule 285 and the receiving-side connector 290 abut each other. In this state, since the ferrule 285 is located at the front due to the biasing force of the spring 284 of the optical connector 280, the protruding claws 283 do not engage with the locking portions 291 of the receiving-side connector 290.

(3) Protruding Claw Locking Step

Figure 23:
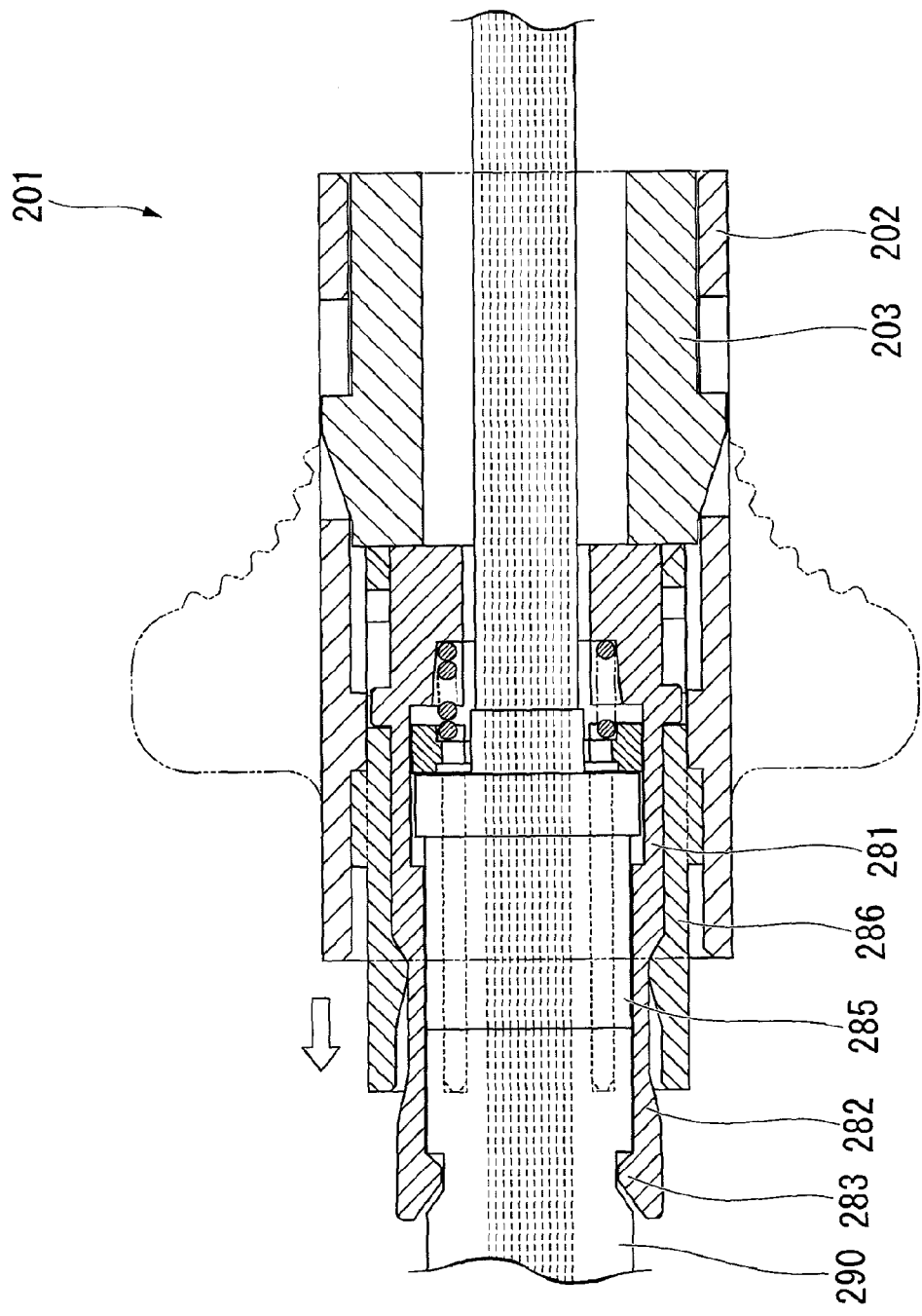
FIG. 23 is a view showing the connecting step using the optical connector connecting jig.

When the optical connector 280 is further moved forward in the connecting direction from the state of FIG. 22, as shown in FIG. 23, the ferrule 285 retreats due to the pressing force from the receiving-side connector 290. As the ferrule 285 retreats, the receiving-side connector 290 enters the optical connector 280 relatively, and thereby, protruding claws 283 engage with the locking portions 291 of the receiving-side connector 290.

At this time, since the spring constant of the spring 204 of the optical connector connecting jig 201 is made sufficiently greater than the spring constant of the spring 284 of the optical connector 280, the pressing member 203 does not retreat with respect to the jig body 202. That is, since the optical connector connecting jig 201 maintains the normal state and the relative positional relationship between the jig body 202 and the pressing member 203 does not change, the relative positional relationship between the housing 286 of the optical connector 280 and the engaging member 281 does not change. That is, since the elastic pieces 282 are not covered with the housing 286, the locking operation of the protruding claws 283 is not hindered.

(4) Elastic Piece Constraining Step

Figure 24:
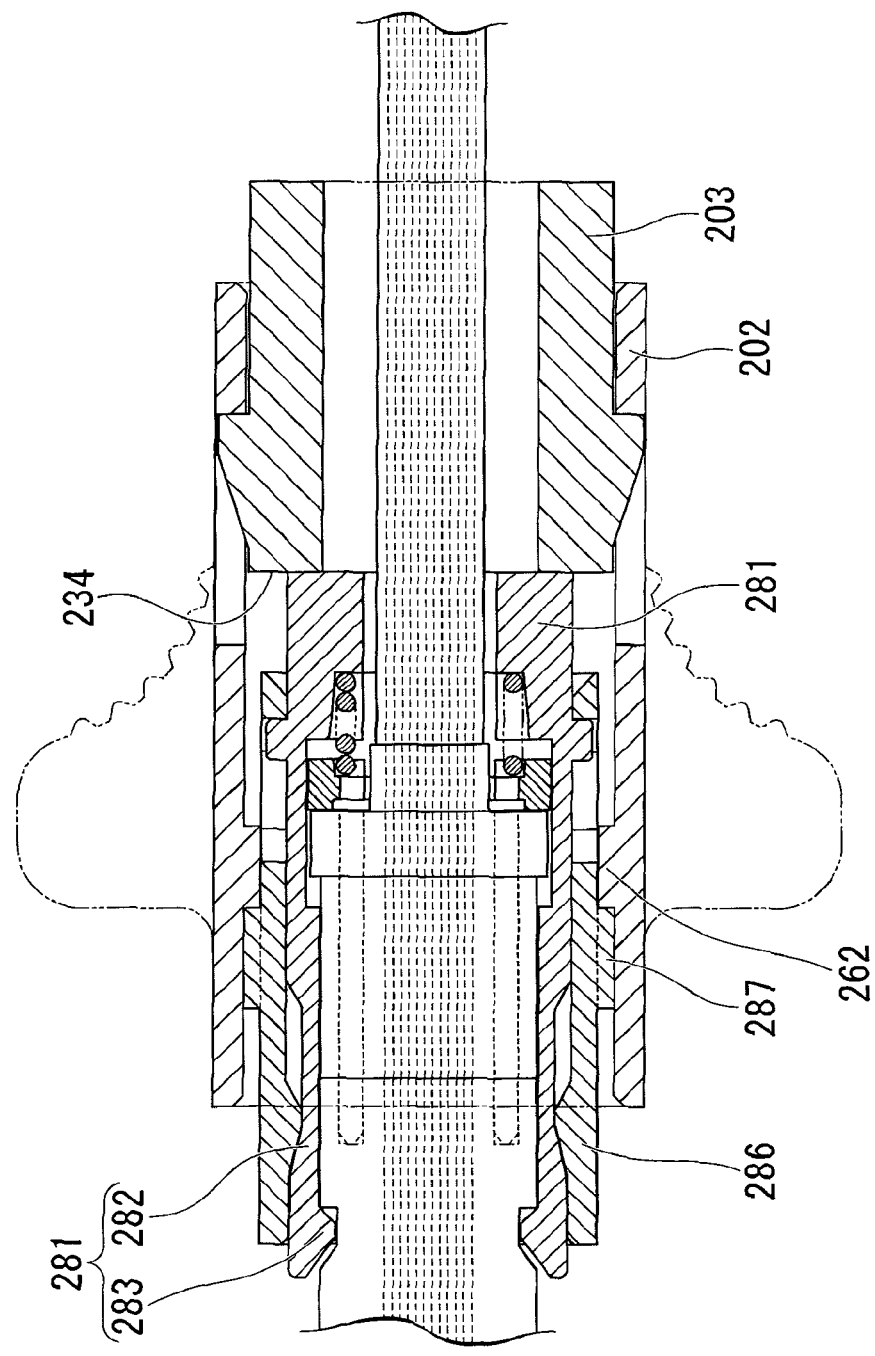
FIG. 24 is a view showing the connecting step using the optical connector connecting jig.

Next, when the optical connector connecting jig 201 is moved forward, as shown in FIG. 24, the housing 286 of the optical connector 280 is regulated by the first regulating portions 262 of the jig body 202 so as not to retreat over a predetermined distance. In this state, the housing 286 is moved forward as the convex portion 287 of the housing 286 is pushed by the first regulating portions 262. At this time, the pressing member 203 retreats as the receiving surfaces 234 are pressed against the rear end of the engaging member 281. As the housing 286 fits from the outer periphery of the engaging member 281 and covers the elastic pieces 282 of the engaging member 281, the elastic pieces 282 and the protruding claws 283 are constrained, and the connection between the optical connector 280 and the receiving-side connector 290 is completed.

The optical connector connecting jig 201 can be separated from the optical connector 280 by retreating the optical connector connecting jig 201 rearward after the completion of the connection.

Figure 25:
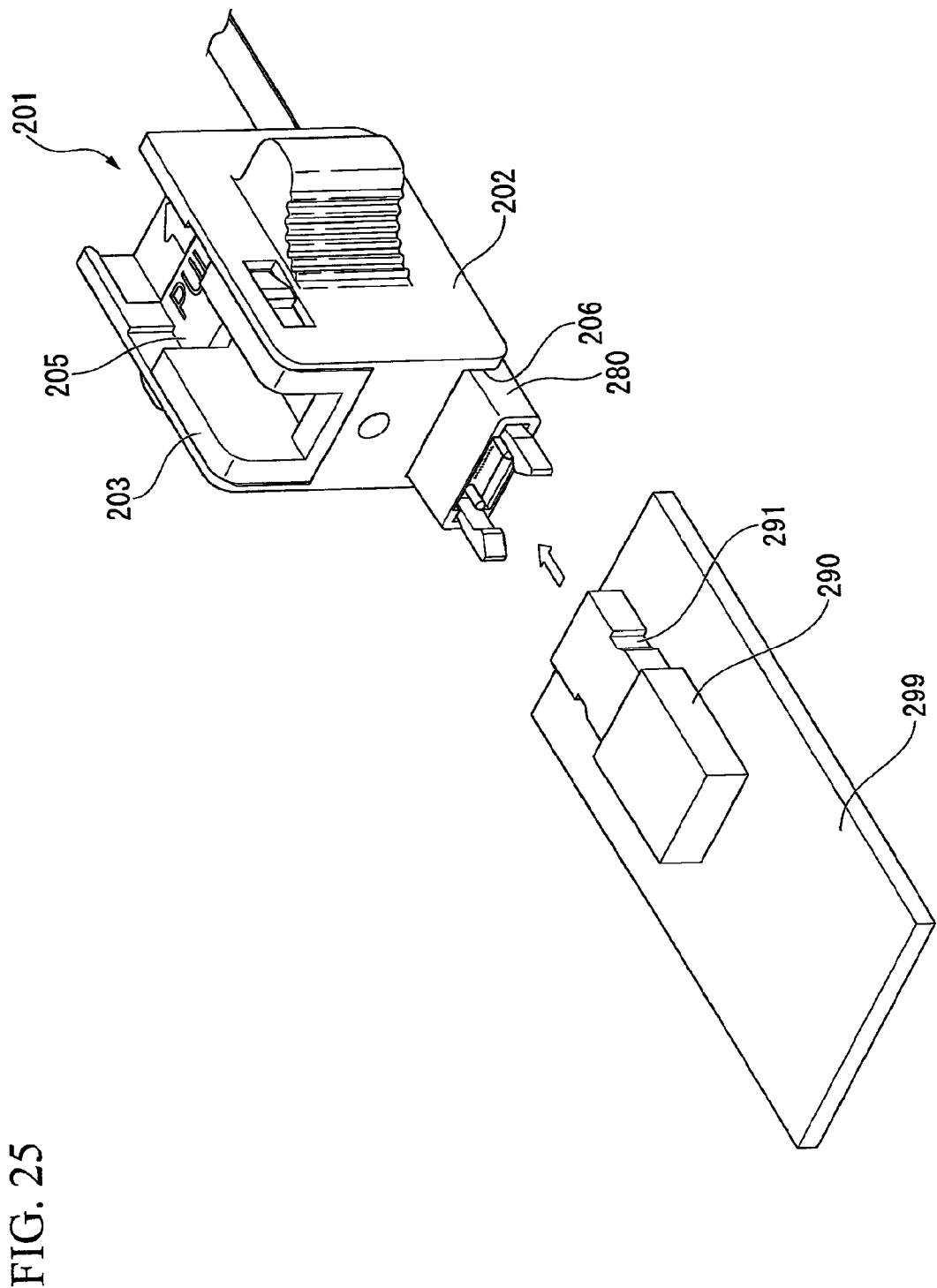
FIG. 25 is a perspective view showing that the optical connector is removed, using the optical connector connecting jig.

Next, the method of removing the optical connector 280 using the optical connector connecting jig 201 will be described. FIG. 25 is a perspective view showing that the optical connector 280 is removed, using the optical connector connecting jig 201, and showing that the optical connector 280 is removed in a state where the optical connector 280 is accommodated in the second accommodating portion 206 of the optical connector connecting jig 201. The optical connector connecting jig 201 is used such that the second accommodating portion 206 is turned down and the first accommodating portion 205 is turned up.

In addition, in the removal process, the pressing member 203 is not used, and removal of the optical connector 280 is performed by the action caused only by the jig body 202.

Next, the removal process will be described in detail with reference to FIGS. 26 to 28.

Figure 26:
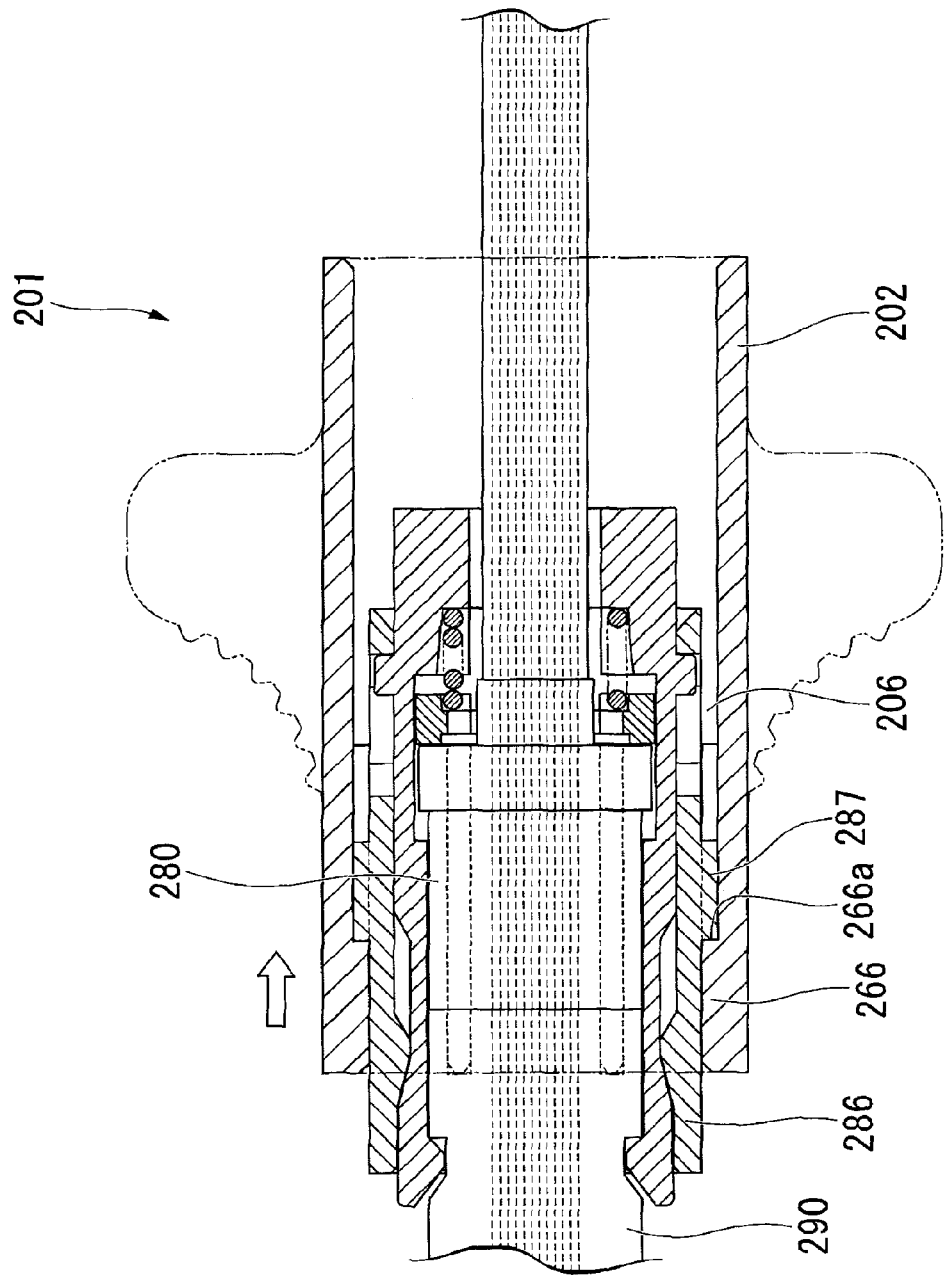
FIG. 26 is a view showing a removing step using the optical connector connecting jig.

FIG. 26 shows that the optical connector connecting jig 201 has been moved rearward in the connecting direction in a state where the optical connector 280 is accommodated in the second accommodating portion 206. By moving the optical connector connecting jig 201 rearward in the connecting direction, the rear ends 266a of the second regulating portions 266 of the second accommodating portion 206 abut the convex portion 287 of the housing 286.

Figure 27:
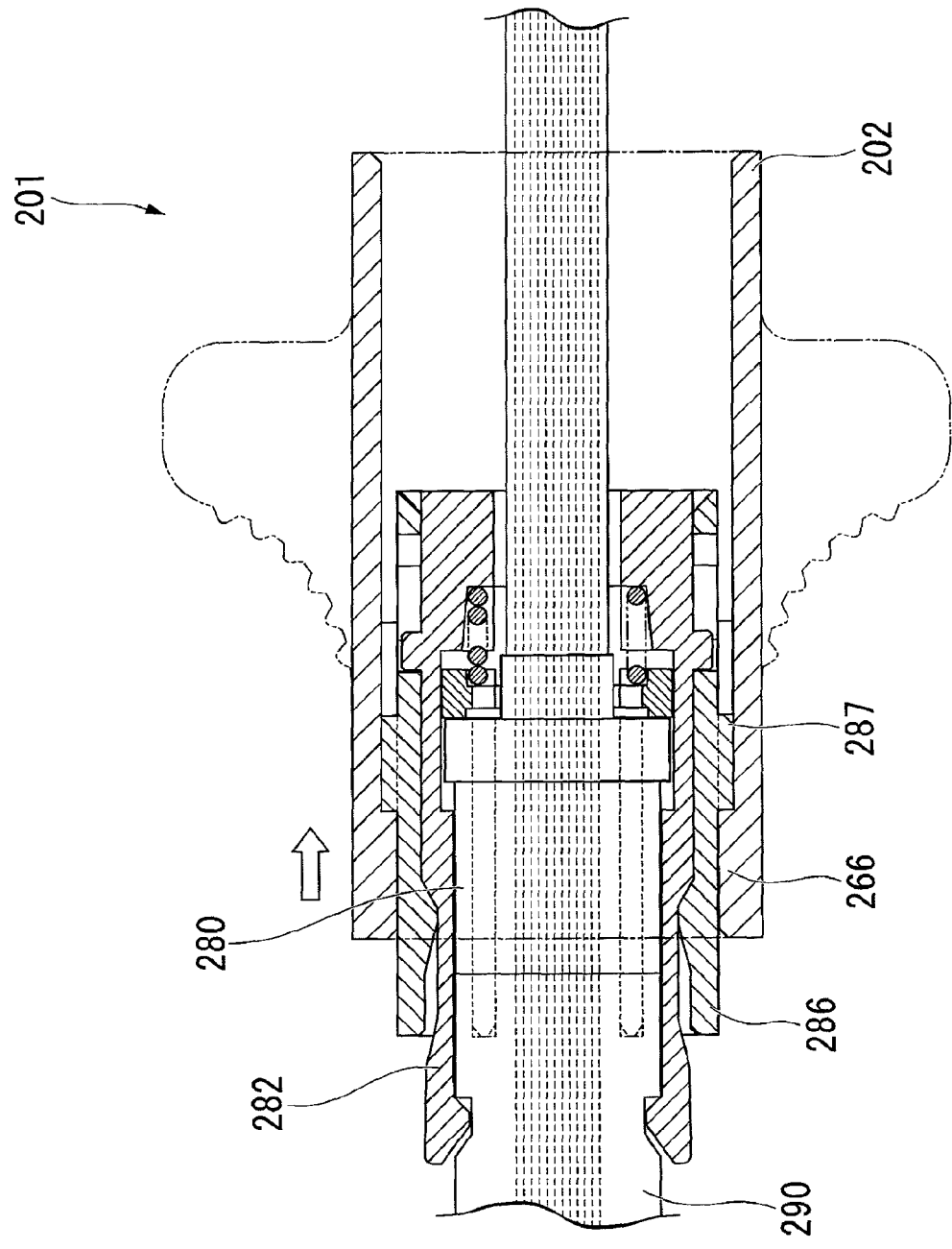
FIG. 27 is a view showing the removing step using the optical connector connecting jig.
Figure 28:
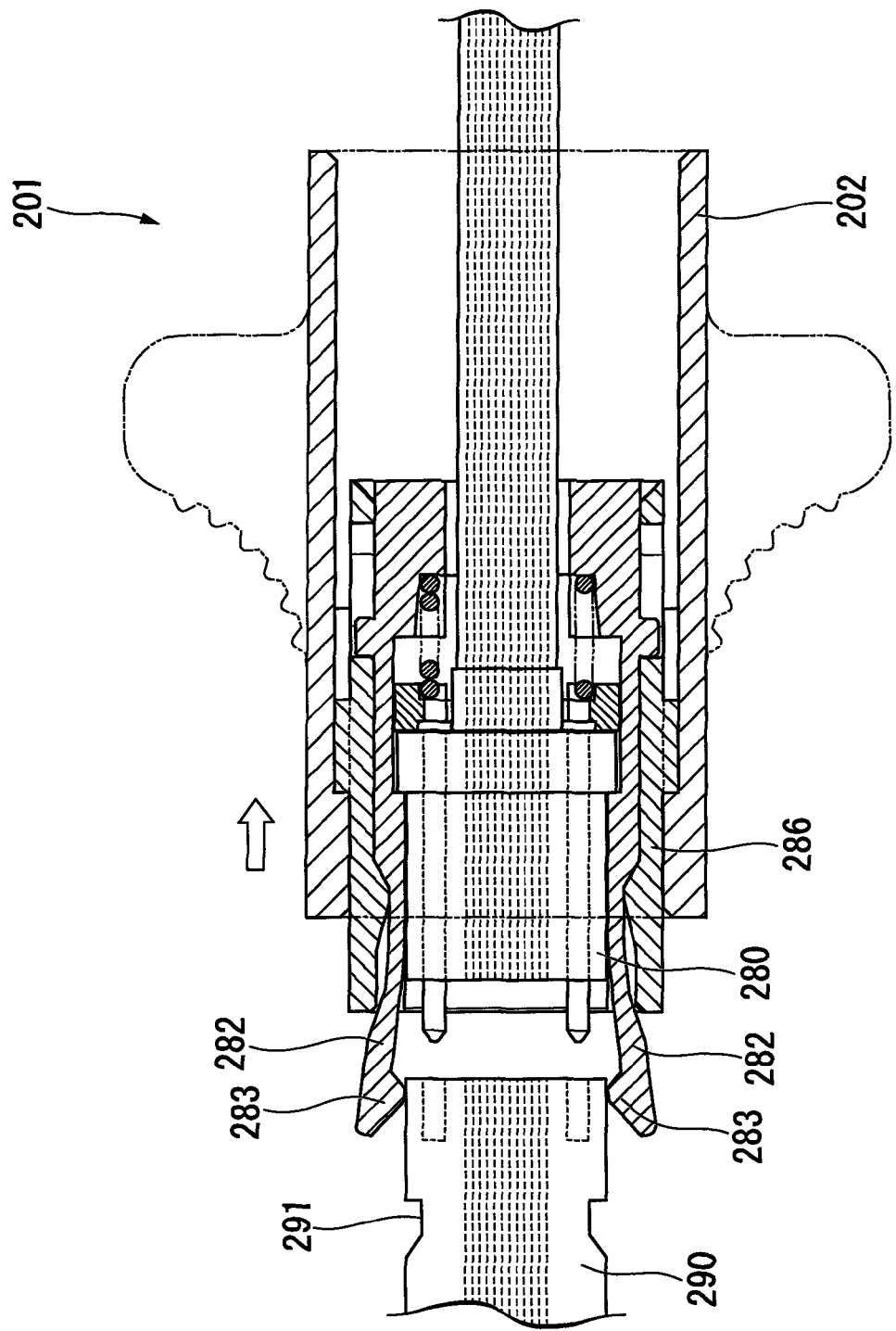
FIG. 28 is a view showing the removing step using the optical connector connecting jig.

Further, when the optical connector connecting jig 201 is moved rearward, the second regulating portions 266 of the second accommodating portion 206 press the convex portion 287 of the housing 286, and thereby, as shown in FIG. 27, the housing 286 moves rearward. This exposes the front portions of the elastic pieces 282. Further, when the optical connector connecting jig 201 is moved rearward, as shown in FIG. 28, the protruding claws 287 are separated from the locking portions 291 of the receiving-side connector 290, so that the optical connector 280 can be removed.

According to the present embodiment, the pressing member 203 is adapted to be capable of retreating with respect to the jig body 202. Thereby, only the housing 286 of the optical connector 280 can be advanced in a state where the housing is regulated by the first regulating portions 262 of the jig body 202 so as not to retreat over a predetermined distance along with the receiving portions 233. Accordingly, the user can connect the optical connector 280 to the receiving-side connector 290 simply by moving the optical connector connecting jig 201 forward.

Additionally, the spring constant of the spring 204 of the optical connector connecting jig 201 is made sufficiently greater than the spring 284 of the optical connector 280. Thereby, the optical connector connecting jig 201 can be moved forward in the connecting direction in a state where the engaging member 281 is made to protrude from the housing 286 without retreating the pressing member 203 with respect to the jig body 202.

That is, according to the present embodiment, the optical connector 280 including the engaging member 281 and the housing 286 can be connected to the receiving-side connector 290 by moving forward the optical connector connecting jig 201 which has the first accommodating portion 205 which can accommodate the optical connector 280. Therefore, even in a small-sized optical connector 280, connection operation is easily performed.

Additionally, since the housing 286 can be moved forward relative to the engaging member 281 when the rearward movement of the housing 286 of the optical connector 280 is regulated by the first regulating portions 261, the workability of the optical connector 280 when inserted can be improved.

Additionally, in a case where the connector grip portions (grip portion) 263 are included, the optical connector 280 can be prevented from being separated in a direction which intersects the front-rear direction when connected.

Moreover, in a case where the second accommodating portion 206 is included, the optical connector 280 can be removed from the receiving-side connector 290 by moving the optical connector connecting jig 201 rearward. Therefore even in a small-sized optical connector 280, the optical connector 280 can be removed with high operability from the receiving-side connector 290.

Since an adapter is indispensable in a plug-adapter-plug connection system using an MPO-type optical connector or the like, the number of parts is large, and consequently, high costs will be incurred. On the other hand, the optical connector 280, which has an engaging member engaging with a receiving-side connector, and a tubular housing externally fitted to the engaging member so as to be movable back and forth, can realize a plug to plug connection system which does not use an adapter.

Additionally, in the optical connector 280, the engaging member 281 can be made to engage with the receiving-side connector 290 and the housing 286 can be moved forward with respect to the engaging member 281, by operating only housing 286. In the optical connector 280, since a force is indirectly applied to the engaging member 281 via the housing 286 which performs an operation, an excessive force may act on the housing 286 and the engaging member 281, and consequently, the housing and engaging member may be damaged. However, if the optical connector connecting jig 201 is used for the connection of the optical connector 280, the connection workability of the optical connector 280 can be improved, and a situation where an excessive force power acts on housing 286 and the engaging member 281 can be avoided. Accordingly, there is no concern about any damage of the optical connector 280, and reliability can be improved.

In addition, in the present embodiment, the compression coil spring is used as the spring 204. However, the present invention is not limited thereto. For example, a configuration in which biasing is performed using a pneumatic spring may be adopted.

While preferred embodiments of the invention have been described and illustrated above, it should be understood that these are exemplary of the invention and are not to be considered as limiting. Additions, omissions, substitutions, and other modifications can be made without departing from the scope of the present invention.

Accordingly, the invention is not to be considered as being limited by the foregoing description, and is only limited by the scope of the appended claims.

What is claimed is:

1. An optical connector comprising:
an engaging member having a pair of elastic pieces that can be engaged with locking portions on both sides of a receiving-side optical connector; and
a movable tubular housing externally fitted to the engaging member,
wherein the pair of elastic pieces approaches each other by an engagement with the locking portions on both sides of the receiving-side optical connector, and thereby, the housing becomes movable forward with respect to the portion of the engaging member that engages with the locking portions,
wherein an engagement state between the elastic pieces and the locking portions on both sides of the receiving-side optical connector is maintained as the pair of elastic pieces abuts an inside of the housing thereby regulating a movement in a direction of being separated from each other when the housing has moved forward with respect to the engaging member, and
wherein tips of the pair of elastic pieces have protruding claws, and are provided with inclined surfaces which incline to a side opposite to the protruding claws toward a front, and a front end portion of the housing abuts the inclined surfaces from a rear side thereof, and thereby, movement of the housing to the front is regulated by the tip portions of the elastic pieces.

2. The optical connector according to claim 1,
wherein the engaging member further includes a biasing member receiving portion which takes a reaction force of a biasing member which biases a ferrule forward, and the pair of elastic pieces protrudes forward from the biasing member receiving portion.

3. The optical connector according to claim 2,
wherein the biasing member is a spring.

4. The optical connector according to claim 1,
wherein the housing and the engaging members are provided with latch structures which engage with each other by engaging protrusions and engaging recesses, and the engaging protrusions abut edges of the engaging recesses, thereby regulating forward or rearward movement of the housing with respect to the engaging member.

5. The optical connector according to claim 1,
wherein the housing has a ferrule engaging portion, which is engageable with a flange portion of a ferrule, at a front side thereof.

6. The optical connector according to claim 1,
wherein a ferrule is an MT-type optical connector, and is provided between the pair of elastic pieces, with a longitudinal direction of a rectangular tip face for abutting and joining being aligned with a direction of a spacing between the pair of elastic pieces of the engaging member.

7. The optical connector according to claim 1, wherein an operating protrusion is provided at an outer periphery of the housing so as to protrude thereof.

8. A connector connection system comprising:
an optical fiber with a connector in which the optical connector according to claim 1 is assembled at a tip of the optical fiber, and
a board with a connector formed by mounting a receiving-side optical connector to which the optical connector is fastened on a circuit board.

9. An optical connector comprising:
an engaging member having a pair of elastic pieces that can be engaged with locking portions on both sides of a receiving-side optical connector; and
a movable tubular housing externally fitted to the engaging member,
wherein the pair of elastic pieces approaches each other by an engagement with the locking portions on both sides of the receiving-side optical connector, and thereby, the housing becomes movable forward with respect to the portion of the the par of elastic pieces that engages with the locking portions,
wherein an engagement state between the elastic pieces and the locking portions on both sides of the receiving-side optical connector is maintained as the pair of elastic pieces abuts an inside of the housing thereby regulating a movement in a direction of being separated from each other when the housing has moved forward with respect to the engaging member, and
wherein the engaging member further includes a regulating member which regulates forward movement of a ferrule which is biased forward.

10. An optical connector comprising:
an engaging member having a pair of elastic pieces that can be engaged with locking portions on both sides of a receiving-side optical connector; and
a movable tubular housing externally fitted to the engaging member,
wherein the pair of elastic pieces approaches each other by an engagement with the locking portions on both sides of the receiving-side optical connector, and thereby, the housing becomes movable forward with respect to the portion of the engaging member that engages with the locking portions,
wherein an engagement state between the elastic pieces and the locking portions on both sides of the receiving-side optical connector is maintained as the pair of elastic pieces abuts an inside of the housing thereby regulating a movement in a direction of being separated from each other when the housing has moved forward with respect to the engaging member, and
wherein protruding claws are formed on internal surface sides of tip portions of the elastic pieces and inner walls of the housing abut opposite surface sides of the internal surface sides with the protruding claws.

* * * * *